US010669091B2

(12) United States Patent
Astigarraga et al.

(10) Patent No.: US 10,669,091 B2
(45) Date of Patent: Jun. 2, 2020

(54) AUTOMATED HEALTH PRODUCT DISPENSARY LIBRARY

(71) Applicant: International Business Machines Corporation, Armonk, NY (US)

(72) Inventors: Tara Astigarraga, Fairport, NY (US); Louie A. Dickens, Tucson, AZ (US); Dennis W. Fried, Tucson, AZ (US); Michael P. McIntosh, Tucson, AZ (US); Stephen L. Schwartz, Tucson, AZ (US); Daniel J. Winarski, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/641,196

(22) Filed: Mar. 6, 2015

(65) Prior Publication Data

US 2016/0257493 A1 Sep. 8, 2016

(51) Int. Cl.

| | |
|---|---|
| ***B65G 1/06*** | (2006.01) |
| ***B65D 85/02*** | (2006.01) |
| ***B65D 25/04*** | (2006.01) |
| ***B65G 1/137*** | (2006.01) |
| ***B65C 3/26*** | (2006.01) |
| ***G07F 17/00*** | (2006.01) |
| ***G07F 11/62*** | (2006.01) |
| ***G07F 17/18*** | (2006.01) |

(52) U.S. Cl.

CPC ................ *B65D 85/02* (2013.01); *B65C 3/26* (2013.01); *B65D 25/04* (2013.01); *G07F 11/62* (2013.01); *G07F 17/0092* (2013.01); *G07F 17/18* (2013.01)

(58) Field of Classification Search

CPC .......... B65D 85/02; B65D 25/04; B65C 3/26; G07F 17/0092; G07F 17/18; G07F 11/62

USPC .................................................. 700/231–244

See application file for complete search history.

(56) References Cited

U.S. PATENT DOCUMENTS

| | | | | |
|---|---|---|---|---|
| 5,205,436 A * | 4/1993 | Savage | ..................... | A47F 3/02 221/1 |
| 5,472,113 A | 12/1995 | Shaw | | |
| 5,499,707 A * | 3/1996 | Steury | ..................... | G07F 7/069 186/36 |
| 5,877,644 A | 3/1999 | Christensen et al. | | |

(Continued)

FOREIGN PATENT DOCUMENTS

| | | |
|---|---|---|
| CN | 1668267 A | 9/2005 |
| CN | 102132344 A | 7/2011 |
| CN | 102718011 A | 10/2012 |

OTHER PUBLICATIONS

ECMA, "Data Interchange on 12,7 mm 384-Track Magnetic Tape Cartridges—Ultrium-1 Format," Standard ECMA-319, Jun. 2001, 160 pages.

(Continued)

*Primary Examiner* — Michael Collins
(74) *Attorney, Agent, or Firm* — Zilka-Kotab, P.C.

(57) ABSTRACT

An automated health product dispensary library, according to one embodiment includes storage slots configured to receive health product cartridges that have health products therein; and an accessor, configured to transport tape cartridges, for transporting the health product cartridges. Other systems, methods, and computer program products are described in additional embodiments.

19 Claims, 13 Drawing Sheets

(56) References Cited

U.S. PATENT DOCUMENTS

| | | | | |
|---|---|---|---|---|
| 5,920,438 | A | 7/1999 | Christensen et al. | |
| 6,356,803 | B1 | 3/2002 | Goodman et al. | |
| 6,604,019 | B2 | 8/2003 | Ahlin et al. | |
| 6,848,593 | B2 | 2/2005 | Papp | |
| 6,915,977 | B2 * | 7/2005 | Hanzlik | G11B 23/04 242/348 |
| 7,006,894 | B2 | 2/2006 | de la Huerga | |
| 7,271,971 | B2 | 9/2007 | Hutchins et al. | |
| 7,359,135 | B2 | 4/2008 | Hutchins et al. | |
| 7,436,615 | B2 | 10/2008 | Eleftheriou et al. | |
| 7,495,854 | B2 | 2/2009 | Hutchins et al. | |
| 7,589,927 | B2 | 9/2009 | Hutchins et al. | |
| 7,596,176 | B2 | 9/2009 | Eleftheriou et al. | |
| 7,635,246 | B2 * | 12/2009 | Neeper | G01N 35/00732 414/280 |
| 7,821,733 | B2 | 10/2010 | Eleftheriou et al. | |
| 7,843,663 | B2 | 11/2010 | Nave et al. | |
| 8,090,472 | B2 * | 1/2012 | Schifman | G07F 11/44 700/231 |
| 8,196,774 | B1 | 6/2012 | Clarke et al. | |
| 8,204,620 | B2 | 6/2012 | Mallett et al. | |
| 8,265,786 | B2 | 9/2012 | Jesionowski et al. | |
| 8,308,414 | B2 * | 11/2012 | Schifman | G07F 11/44 100/10 |
| 8,375,941 | B2 | 2/2013 | King et al. | |
| 8,469,228 | B2 * | 6/2013 | Adams | G07F 7/0609 211/129.1 |
| 8,605,380 | B1 | 12/2013 | Christensen et al. | |
| 8,625,226 | B2 | 1/2014 | Christensen et al. | |
| 8,738,177 | B2 * | 5/2014 | van Ooyen | G06F 19/3462 700/235 |
| 9,361,431 | B2 * | 6/2016 | Fauci | G06F 19/3462 |
| 2004/0105187 | A1 * | 6/2004 | Woodruff | G11B 15/6825 360/92.1 |
| 2004/0254676 | A1 * | 12/2004 | Blust | G06Q 10/087 700/231 |
| 2005/0057847 | A1 * | 3/2005 | Armagost | G11B 15/6835 360/92.1 |
| 2006/0161944 | A1 * | 7/2006 | Edwards | G11B 23/0323 720/725 |
| 2008/0077274 | A1 * | 3/2008 | Kim | G06F 19/3462 700/237 |
| 2008/0231988 | A1 | 9/2008 | Nave et al. | |
| 2009/0114672 | A1 * | 5/2009 | Schifman | G07F 11/44 221/133 |
| 2012/0130534 | A1 * | 5/2012 | Wurm | G06Q 20/203 700/236 |
| 2013/0261794 | A1 * | 10/2013 | Fauci | G06F 19/3462 700/237 |
| 2015/0005934 | A1 * | 1/2015 | Bell | G06F 19/3462 700/237 |
| 2016/0253479 | A1 * | 9/2016 | Fauci | G06F 19/3462 |

OTHER PUBLICATIONS

Nave et al., U.S. Appl. No. 11/674,904, filed Feb. 14, 2007.

Office Action from Chinese Patent Application No. 201610123818.1, dated Nov. 1, 2017.

* cited by examiner

AUTOMATED HEALTH PRODUCT DISPENSARY LIBRARY

BACKGROUND

The present invention relates to storage systems, and more particularly, this invention relates to automated health product dispensary libraries.

Automated data storage libraries are known for providing cost effective storage and retrieval of large quantities of data. The data in automated data storage libraries is typically stored on media which is housed in data storage cartridges that are, in turn, stored at storage slots or the like inside the library in a fashion that renders the media, and its resident data, accessible for physical retrieval. Data storage cartridge media in the past has included types of media on which data may be stored and which may serve as removable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the X and Y directions.

Moreover, in an effort to increase storage capacity, deep slot technology allows for storage cells that contain more than a single data storage cartridge. Such storage libraries allow for higher density, or more cartridges stored per square foot. In deep slot libraries, two or more cartridges may be stored in a multi-cartridge deep slot cell, arrayed in series, one behind the other, in tiers ranging from a frontmost tier to a rearmost tier.

BRIEF SUMMARY

An automated health product dispensary library, according to one embodiment includes storage slots configured to receive health product cartridges that have health products therein; and an accessor, configured to transport tape cartridges, for transporting the health product cartridges.

A health product cartridge, according to another embodiment includes a housing having a form factor of a tape cartridge, the housing defining an interior for storing a health product, the housing having an access portion for providing access to the interior.

A method, according to another embodiment includes receiving a request for a health product cartridge having a health product therein; instructing an accessor to retrieve the health product cartridge from a storage slot of an automated health product dispensary library; and providing the health product to a user.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
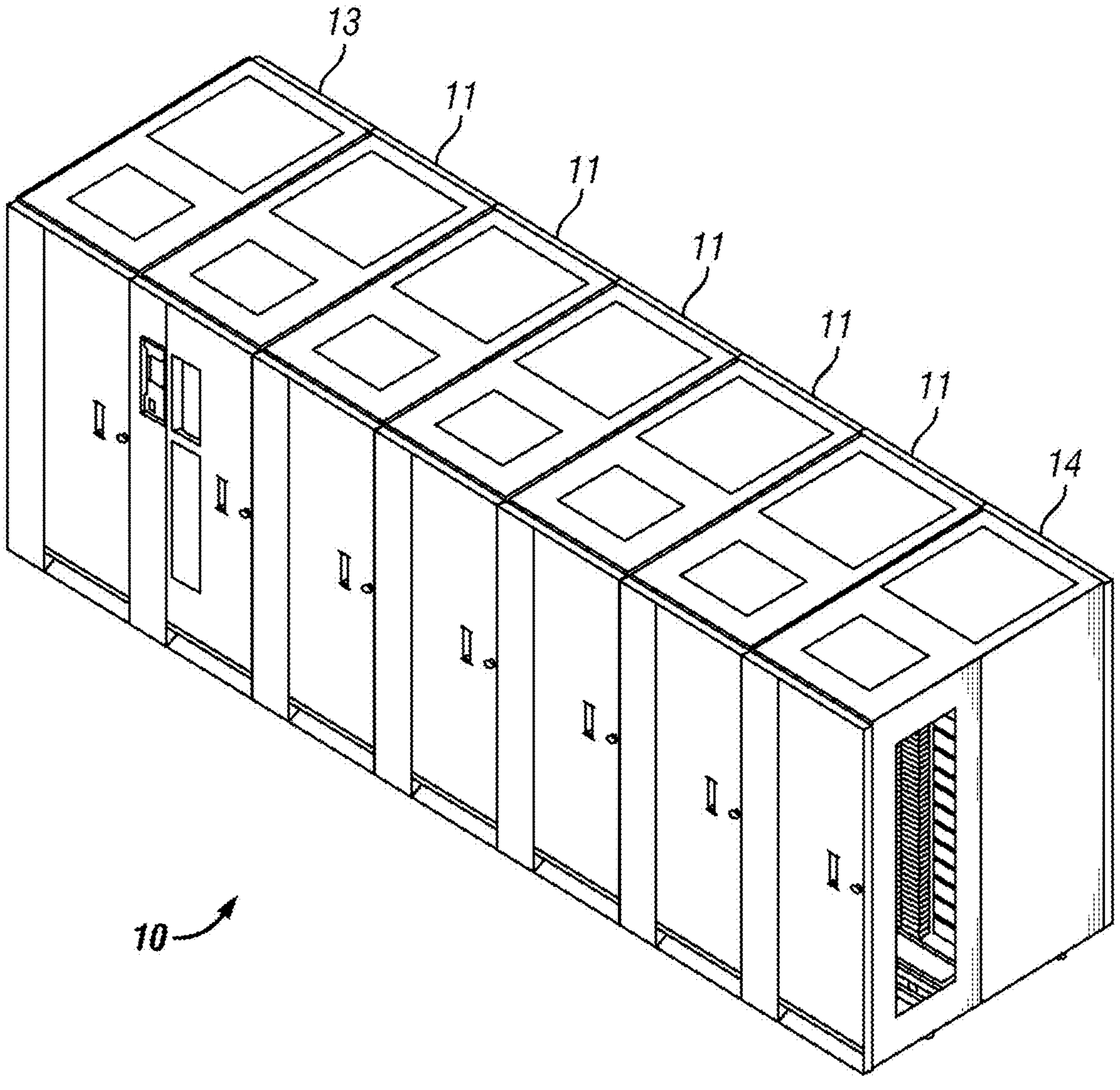
FIG. 1A is a perspective view of an automated health product dispensary library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of storage systems, as well as operation and/or component parts thereof. Various embodiments described herein include automated health product dispensary libraries which may incorporate various components of automated data storage libraries. According to some approaches, automated health product dispensary libraries disclosed herein may utilize health product cartridges having the approximate and/or exact form factor of a tape cartridge to store health products therein, as will be described in further detail below.

In one general embodiment, an automated health product dispensary library includes storage slots configured to receive health product cartridges that have health products therein; and an accessor, configured to transport tape cartridges, for transporting the health product cartridges.

In another general embodiment, a health product cartridge includes a housing having a form factor of a tape cartridge, the housing defining an interior for storing a health product, the housing having an access portion for providing access to the interior.

In another general embodiment, a method includes receiving a request for a health product cartridge having a health product therein; instructing an accessor to retrieve the health product cartridge from a storage slot of an automated health product dispensary library; and providing the health product to a user.

As described above, automated tape libraries present an efficient method of organizing a large amount of magnetic material such that a tape storing desired data is easily accessible. Moreover, automation of health product libraries would increase the efficiency of distributing and receiving health products of various types. Although these automated tape libraries have been used to store tape media, various embodiments described herein may implement various aspects of automated tape libraries which have been repurposed to accommodate health products (e.g., pharmaceutical items) such as prescription drugs, medical supplies (e.g., blood sugar strip testers, bandages, etc.), non-prescription drugs, etc. It follows that different components of the various embodiments described herein may have similar and/or the same functionality of comparable components in automated tape libraries as will be described in further detail below.

Figure 1B:
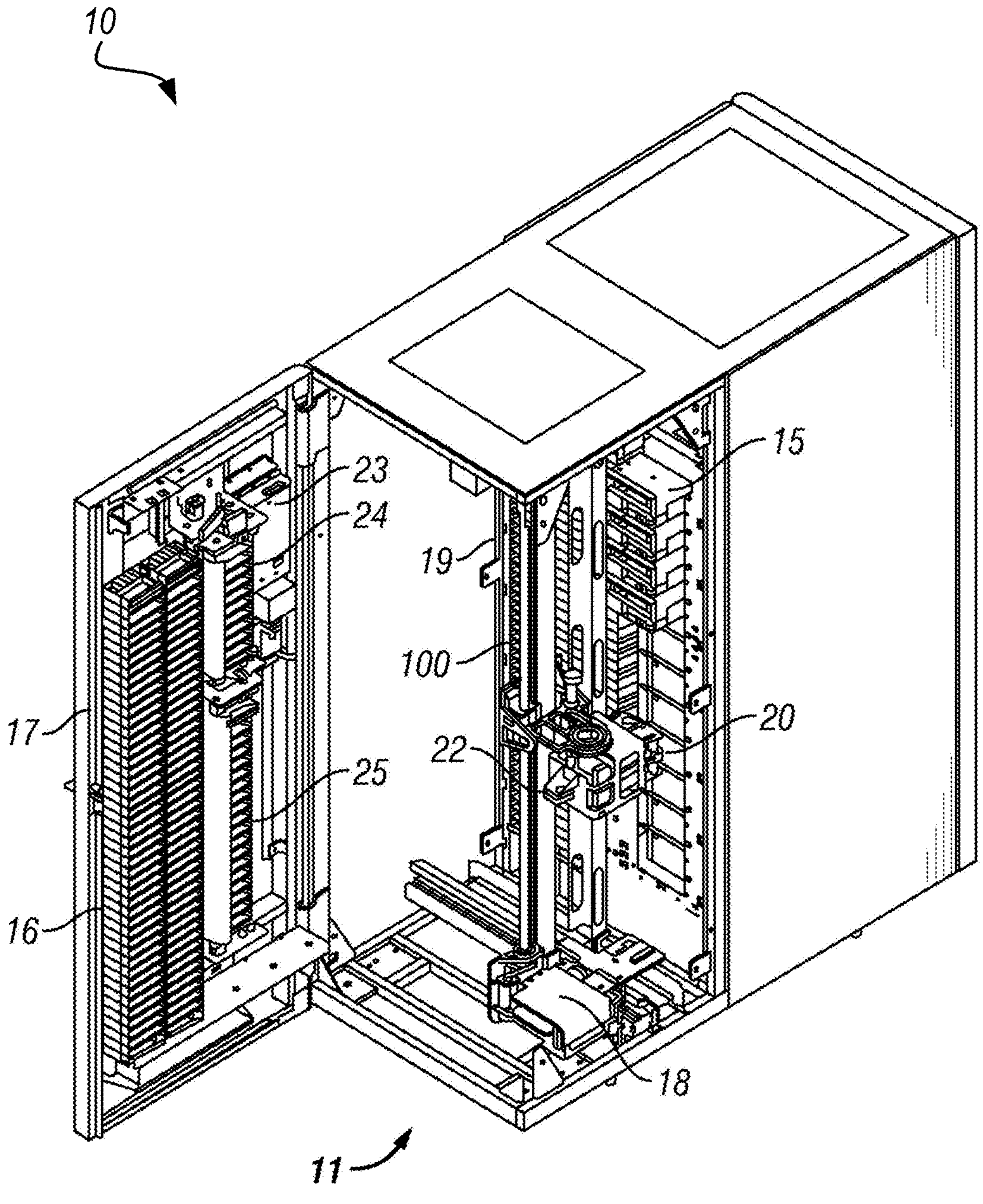
FIG. 1B is a perspective view of a storage frame from the health product dispensary library of FIG. 1A.

FIGS. 1A-1B illustrate an automated health product dispensary library 10 (also referred to herein as library 10) which stores and retrieves health product cartridges, containing health products therein (not shown). The health product cartridges may be stored in and retrieved from multi-cartridge deep slot cells 100 and single cartridge storage slots 16, as will be described in further detail below.

As previously mentioned, automated health product dispensary libraries of the various embodiments described herein may include components of automated data storage libraries, and function similarly to automated data storage libraries, e.g., in the sense that cartridges containing material may be located and/or retrieved by an automated accessor upon request. Moreover, automated health product dispensary libraries may include health product cartridges having a form factor similar and/or the same as that of a tape cartridge used in data storage libraries. An example of an automated data storage library which may have a similar configuration as that of the automated health product dispensary library 10 depicted in FIGS. 1A-1B, and components of which may be implemented with some of the various approaches herein is the IBM 3584 UltraScalable Tape Library. However, it should be noted that the various components and/or functionality of automated data storage libraries referred to herein are in no way intended to limit the invention. Rather, references to the aspects of automated data storage libraries herein are made with the intent of supporting the description of the automated health product dispensary libraries according to the various embodiments disclosed herein, and permutations thereof, as would be appreciated by one skilled in the art upon reading the present description. Thus, although the automated health product dispensary library 10 may function similarly and/or the same in some respects to an automated tape library, some of the automated health product dispensary libraries 10 described herein exist with a proviso that there are no tape drives present therein.

Referring still to FIG. 1A, the library 10 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 1B shows an exemplary embodiment of a storage frame 11, which acts as the base frame of the library 10. Moreover, the storage frame 11 illustrated in FIG. 1B may serve as a minimum configuration of the library 10 according to an exemplary embodiment. According to a minimalistic approach, storage frame 11 may include only a single accessor 18, such that there are no redundant accessors, and no service bay. However, in other embodiments, a storage frame may include multiple robotic accessors and/or service bays.

Looking to FIG. 1B, the library 10 is arranged for using the accessor 18 to locate and retrieve health product cartridges, e.g., in response to commands from at least one external host system (not shown). As used in various embodiments herein, accessors which are configured to transport tape cartridges may be used to transport the health product cartridges. In other words, tape cartridge accessors may be configured to locate, retrieve and/or replace health product cartridges from storage slots in a storage library. Accordingly, the health product cartridges according to any of the approaches described herein may have an external form factor similar and/or the same as a conventional data storage cartridge such as a Linear Tape Open (LTO)-compatible cartridge, or any other cartridge which preferably has the same and/or similar outer dimensions as other tape cartridges, thereby desirably facilitating compliance with a common accessor and/or library.

The health product cartridges may be retrieved from storage slots, in which the health product cartridges may be stored. Accordingly, the library 10 is illustrated as including a plurality of storage slots 16 on front wall 17 and a plurality of multi-cartridge deep slot cells 100 on rear wall 19, both of which may be used to store health product cartridges that may contain health products as will be described in further detail below. According to one approach, the storage slots 16 may be configured to store a single health product cartridge, and the multi-cartridge deep slot cells 100 may be configured to store a plurality of health product cartridges. In a preferred approach, the multi-cartridge deep slot cells may be arranged in sequential order of tiers from front to rear (e.g., see FIG. 7A), and in some approaches may be further configured to store magazines of health product cartridges.

With continued reference to FIG. 1B, the storage frame 11 of the library 10 also includes at least one storage drive 15. According to one approach, storage drive 15 may be used to access health products stored in the health product cartridges. However, in other approaches health product cartridges may be made directly available to users, e.g., via an I/O station. Thus, a first accessor 18 may be used to transport health product cartridges between the plurality of storage slots 16, the multi-cartridge deep slot cells, and/or the storage drive(s) 15.

As illustrated, the storage frame 11 may include an upper I/O station 24 and/or a lower I/O station 25, thereby allowing health product storage cartridges to be added (e.g., inserted) to the library inventory and/or removed from the library, e.g., by a user, without disrupting library operation. Furthermore, the library 10 may have one or more storage frames 11, each having storage slots 16, preferably accessible by the first accessor 18.

Automated health product dispensary library 10 may optionally include an operator panel 23 or alternate user interface, e.g., such as a web-based interface, which allows a user to interact with the library 10. Accordingly, a user may be able to access one or more particular health product cartridges, inquire as to the status of one or more health product cartridges, etc. The storage frame 11 may also optionally include a speaker, a display screen and/or a printer for informing a user of warnings, e.g., potential side effects, associated medical risks, etc.; instructions, e.g., proper use, dosages, times between dosages, etc.; etc. associated with the health products made available. The speaker, display screen and/or a printer may display these warnings, instructions, etc. to the user by providing a printout, playing an audio recording, projecting a video clip of a doctor and/or pharmacist talking about the information, etc.

As described above, the storage frames 11 may be configured with different components depending upon the intended function. One configuration of storage frame 11 may comprise storage slots 16 and/or multi-cartridge deep slot cells 100, storage drive(s) 15, and/or other optional components which preferably operate to store and retrieve health products from the health product storage cartridges. However, in another approach, a storage frame 11 may include storage slots 16 and/or multi-cartridge deep slot cells 100 and no other components. The first accessor 18 may have a gripper assembly 20, e.g., for gripping one or more health product cartridges, in addition to having a bar code scanner reading system 22 and/or other reading system(s), such as a cartridge memory reader or similar system mounted on the gripper assembly 20, to "read" identifying information about the health product(s) stored in a given health product cartridge.

Figure 2A:
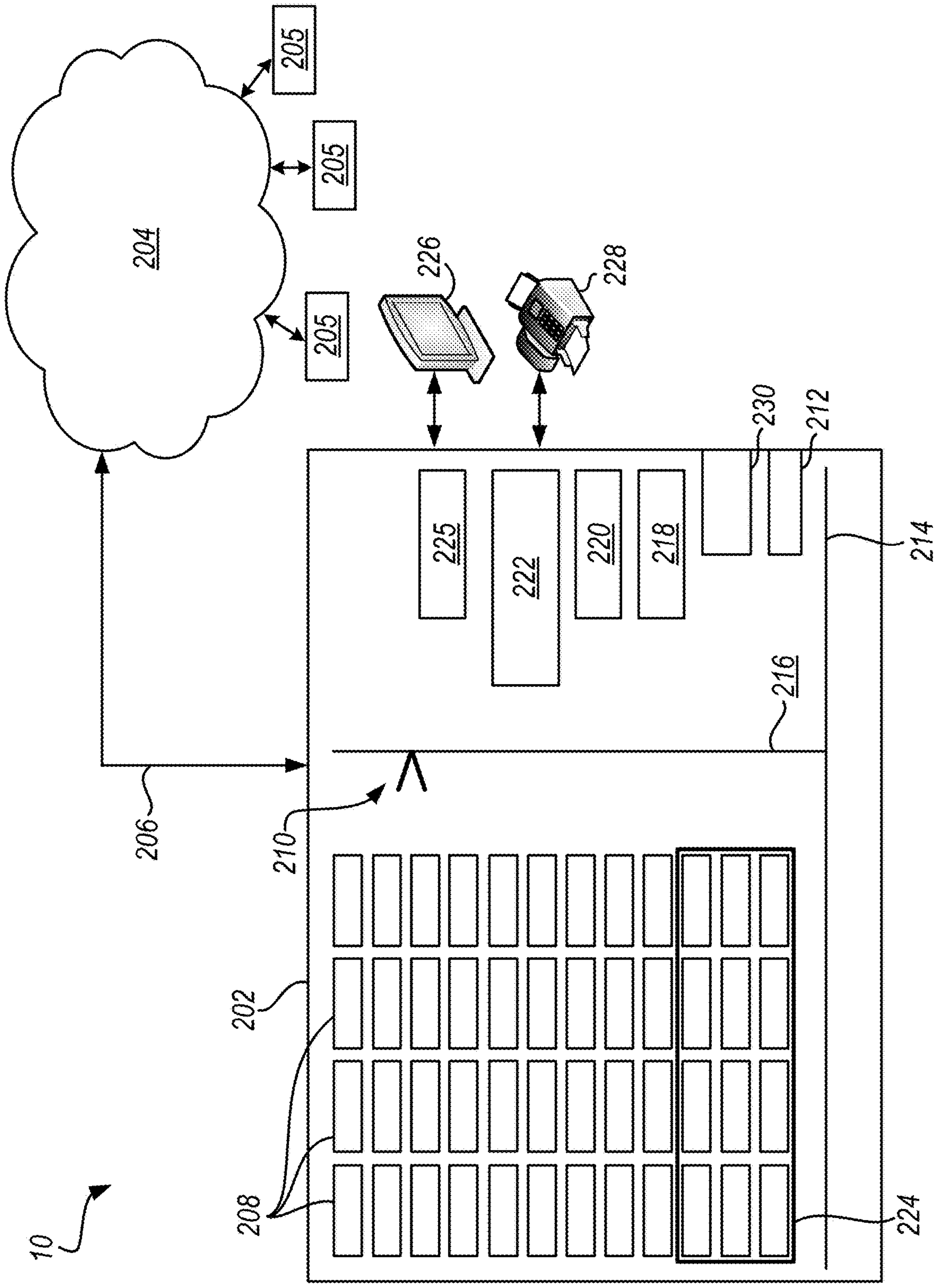
FIG. 2A is a representational diagram of an automated health product dispensary library according to one embodiment.

In view of the description provided above for FIGS. 1A-1B, FIG. 2A illustrates a representational diagram of an automated health product dispensary library 10 according to one embodiment. Accordingly, the representational diagram of FIG. 2A may outline the structure and/or performance of one or more of the automated health product dispensary libraries 10 of FIGS. 1A-1B, but is in no way intended to be limited thereto.

It follows that, as an option, the present automated health product dispensary library 10 of FIG. 2A may be implemented in conjunction with features from any other embodiment listed herein, such as those described with reference to the other FIGS., such as FIGS. 1A-1B. However, such automated health product dispensary library 10 and others presented herein may be used in various applications and/or in permutations which may or may not be specifically described in the illustrative embodiments listed herein. Further, the automated health product dispensary library 10 presented herein may be used in any desired environment. Thus FIG. 2A (and the other FIGS.) may be deemed to include any possible permutation.

Referring now to FIG. 2A, the automated health product dispensary library 10 (also referred to herein as library 10) is shown as including a storage frame 202 which may be coupled to a network 204 via a link 206, e.g., providing an electrical connection such as a cable, a wire, a logical bus, wireless connection, etc. Storage frame 202 may also include a plurality of storage slots (not shown) which are preferably configured to receive (e.g., store) health product cartridges 208. Library 10 additionally includes plurality of health product cartridges 208, at least one of which preferably has health products, e.g., prescription medicine, medical supplies, non-prescription medicine, etc., stored therein.

Each of the health product cartridges 208 may be individually accessed by an accessor 210. It should be noted that although only one accessor 210 has been illustrated in the present embodiment, the automated health product dispensary library 10 is in no way limited thereto. Accordingly, the automated health product dispensary library 10 may include two or more accessors which access an overlapping area of health product cartridges 208, unique subsets of the health product cartridges 208, etc., depending on the desired approach. Moreover, as described above, accessor 210 may be configured to transport tape cartridges and used to transport the health product cartridges 208. In other words, a tape cartridge accessor may be configured to locate, retrieve and/or replace health product cartridges 208 from storage slots (not shown) in the storage library 10.

According to some approaches, the network 204 may be coupled to one or more devices 205 such as a server, a remote computer, another library, etc., which communicate with the health product dispensary library 10 via the network 204. A device 205, e.g., a server or remote host, may act as a control unit for the automated health product dispensary library 10. Thus, a device 205 may send command and/or control signals to the automated health product dispensary library 10 via network 204. Furthermore, users may be able to access the device 205 via the network 204 and preferably input information which affects the operation of the automated health product dispensary library 10. Thus, a user may be able to enter one or more desired health products using a device 205, e.g., using a laptop, tablet, smartphone, desktop, etc., connected to the network 204 to be retrieved by the automated health product dispensary library 10.

I/O station 212 provides access to the cartridges 208 within the storage frame 202. Specifically, I/O station 212 allows for health product cartridges 208 to be removed from and/or inserted into the storage frame 202. According to one approach, the accessor 210 may locate and retrieve one or more desired health product cartridges 208 and deliver them to the I/O station 212 whereby they may be removed from the storage frame 202 by a user. Similarly, accessor 210 may retrieve cartridges 208 inserted into I/O station 212 of the library 10 and return the cartridges 208 to an appropriate storage location.

Depending on the approach, the accessor 210 may locate a desired health product cartridges 208 by scanning an identification tag of each cartridge 208 in the library 10 until the desired one or more cartridges are found, by accessing data stored on the memory of each of the cartridges (e.g., see FIG. 5A-5B), looking up the storage location of the desired one or more cartridge within the storage frame 202 from memory (e.g., a lookup table), etc. Accessor 210 may travel along X and Y positioning arms 214, 216 to access the I/O station 212, agitator 218, bottle filling station 220, labeler 222 and any of the cartridges 208 stored in the storage frame 202. However, according to other approaches, the accessor 210 may be able to navigate the area in the storage frame 202 using any other positioning system which would be apparent to one skilled in the art upon reading the present description, e.g., a positionable arm.

A device 205 coupled to the library 10 via network 204 may also monitor and/or audit access requests for certain health product cartridges 208. For example, as previously mentioned, certain health product cartridges 208 may have restricted access whereby they may only be accessed by certain users. Accordingly, such device may monitor cartridge requests sent to the library 10 and reject unauthorized access requests. It follows that in some approaches, a device 205 may function as a controller. However, in other approaches, monitoring and/or auditing access requests for certain health product cartridges 208 of a library may be achieved by implementing a controller, e.g., see 500 of FIG. 5. According to some approaches, a controller may maintain an inventory of health product cartridges 208 stored in an associated health product dispensary library. Moreover, the inventory of health product cartridges 208 may be updated fully, partially, etc. upon completion of a task, after an amount of time has passed, on demand, etc., depending on the desired approach. In some approaches, an inventory of health product cartridges 208 may be used to generate requests for additional health products. For example, when the supply of a certain health product is low (e.g., below a given threshold), a controller may send a request to a distributor for restocking supplies. According to another example, when one or more health product cartridge 208 become empty, they may be returned to their respective suppliers to be refilled and/or replaced. Moreover, health product usage rates may be used to determine when steps are taken to perform refilling and/or replacement of health product cartridges 208 of a given library 10, e.g., to increase efficiency and reduce wait time. Accordingly, requests for additional health products may be sent as a result of monitoring the inventories of a library, e.g., without human intervention.

One or more physical 224 and/or logical partitions may be implemented and preferably enforced by a remote and/or local controller (e.g., device 205, controller 225, respectively) on the plurality of the health product cartridges 208 in health product dispensary library 10. Physical and/or logical partitions may desirably help facilitate the monitoring and/or auditing of access requests for certain health product cartridges of a library. Moreover, physical and/or logical partitions may help ensure the storage of cartridges, and the health products stored therein, in favorable conditions. It follows that physical and logical partitions preferably correspond to physical attributes of the health products stored in the cartridges of a storage library. For example, logical partitions may be used to account for expiration dates of the contents of various health product cartridges 208, distinguish between different brands of the same and/or similar products of various health product cartridges 208, etc. Furthermore, depending on the number of desired partitions within an automated health product dispensary library 10, different approaches may implement one, two, three, four, multiple, etc. physical 224 and/or logical partitions.

For example, certain health products may preferably be stored in an environment which meets minimum storage standards. Thus, one or more physical partitions 224 may facilitate environmental control to enable different environmental conditions for various health product cartridges, e.g., depending on the health products stored in the cartridges. According to various approaches, the physical partitions 224 may provide library 10 the ability to control an ambient humidity, temperature, pressure, etc. of the associated area of the library. In order to facilitate the different storage standards for various health product cartridges, physical partitions may include walls, doors, barriers, etc. that physically separate the storage slots of different areas of a library. Accordingly, in some approaches accessors may be confined to different areas defined by the physical partitions, whereby access requests for cartridges stored in different areas are routed to the appropriate accessor corresponding thereto. In other approaches, accessors may request clearance, e.g., from a controller, to enter different areas of the library, which may otherwise be isolated and/or unavailable, to complete one or more access requests. For example, an accessor may request access to a refrigerated area of the storage library to retrieve a requested cartridge, whereby a controller may open a door in the partition defining the refrigerated area, thereby allowing the accessor to enter the otherwise isolated area of the library to retrieve the requested cartridge. Moreover, depending on the size of the refrigerated area, the desired storage temperature, etc., the door in the partition may remain open until the accessor retrieves the desired cartridge and exits the refrigerated area. However, in other approaches, the door may be closed after the accessor enters the refrigerated section and may be reopened at a later time when the accessor has retrieved the desired cartridge and is ready to exit the refrigerated section.

Alternatively, one or more physical 224 and/or logical partitions may be used to reduce the time required to locate and/or retrieve various health product cartridges. For example, one or more physical and/or logical partitions may be used to separate health product cartridges based on their frequency of use. Thus, depending on a health product cartridge's access frequency, it may be placed in a "hot" area of the library where more frequently accessed cartridges are given priority for storage therein which may be located closer to an I/O interface and/or more easily accessible by an accessor, it may be placed in a "cold" area of the library which may be located farthest from an I/O interface, or any place in-between the two. According to some approaches, health product cartridges 208 in health product dispensary library 10 may be color coded corresponding to the type of contents stored therein. Accordingly, the color coding may assist an administrator, pharmacist, user, etc. to easily ascertain some information pertaining to the contents of one or more specific health product cartridges 208, any security features associated with specific health product cartridges 208, desired storage conditions of specific health product cartridges 208, etc.

Further still, one or more physical 224 and/or logical partitions may be used to facilitate one or more security feature for various health product cartridges, e.g., depending on the health products stored therein. As previously mentioned, the health products stored in a cartridge may include non-prescription medicines, medical supplies, prescription medicine, etc. Thus, depending on the health products stored in particular cartridges of a library, certain precautions may be required. Requests from a user for cartridges containing health products protected by a security feature may require the user to provide one or more of identification, a prescription, a password, etc. in order for the request to be processed by the library. According to an example, which is in no way intended to limit the invention, a health product dispensary library may include cartridges having prescription drugs stored therein. A user may access an I/O station associated with the library and request one or more of the prescription drug cartridges be delivered to the I/O station. However, before the requested retrieval is performed, the library may request some authorization which indicates the user has permission to gain access to the prescription drugs. Moreover, the physical partitions and/or outer frame of the storage library may further limit a user's access to health products protected by a security feature. Depending on the user's status, acceptable forms of authorization may include a physician's prescription, a government issued identification card read via magnetic stripe reader and/or optical code scanner, a fingerprint, a password, a prescription, etc. When the user provides one or more adequate forms of authorization, the library may retrieve the requested cartridges and deliver them to the user, e.g., via the I/O station. However, if adequate authorization is not provided, the library may alert an administrator, deny the user's request, perform additional security procedure(s) to prevent unauthorized access to the requested cartridges, etc. Accordingly, automated health product dispensary libraries 10 according to preferred approaches perform an authorization process upon receiving a request for ensuring a propriety of the request prior to providing the health product to the requesting entity (e.g., a user).

Referring again to FIG. 2A, the identity of a user requesting one or more health product cartridges from an automated health product dispensary library 10 may be determined using the I/O station 212 which may include a user interface such as a keypad, fingerprint scanner, card reader, etc. Accordingly, the I/O station 212 and/or other features of the library 10 may function as a point of service terminal for users (e.g., customers), as will be described in further detail below.

The automated health product dispensary library 10 may further include a display screen 226 and/or a printer 228 adapted at or near a user interface for outputting warnings, instructions, dosages, etc. to a user regarding the health products being retrieved form the library 10. Such warnings, instructions, dosages, etc. may be stored in a memory of the system, retrieved from a local or remote database, e.g., via a network, etc. For example, display screen 226 (e.g., user interface) may be coupled to an audio projecting device (e.g., speakers). Accordingly, the screen 226 and speakers may play a video and/or audio recording of a pharmacist, physician, etc. describing the potential side effects associated with a drug, explaining the dosages of a medication, describing the recommended method of application for a medical product, etc. to a user regarding the given health products being retrieved form the library 10. According to another example, printer 228 may produce written documents having medical data, patient history, specific instructions from a user's physician, etc., which may supplement or replace a video and/or audio recording. Moreover, any written documentation may also be held with and/or in the requested cartridge, packaging, etc.

As previously mentioned, the accessor 210 is preferably able to access any of the health product cartridges 208 of the library 10 and deliver them to the I/O station 212, agitator 218, bottle filling station 220 and labeler 222 as desired. Agitator 218 may be used to agitate (e.g., shake, rotate, etc.) a health product cartridge 208 as desired. For example, the health product held in some of the cartridges 208 may be in liquid form, and after prolonged stationary storage, different compounds within the liquid may separate. Thus, it may be desirable to shake cartridges 208 holding liquid compounds periodically, before being delivered to a user, upon request, etc. Known agitation mechanism may be adapted for use in various embodiments. In some embodiments, the accessor 210 may be able to shake, rotate, etc. cartridges 208 stored in the library 10, and may thereby function as an agitator.

Bottle filler 220 may be able to access the health products stored in various health product cartridges 208. For example, bottle filler 220 may be able to open an access portion (e.g., see 314 of FIG. 3A) of the cartridge 208 and count the number of health products stored therein. Bottle filler 220 may also be used to transfer the health products stored in cartridges 208 of the library 10 into packages such as bottles. For example, bottle filler 220 may remove a given number of health products stored in a cartridge 208 and transfer the health products to packaging which corresponds to their type and make. According to various approaches, packaging requirements may be imposed by the manufacturers of certain health products stored in the library 10, by the Food and Drug Administration (FDA), etc. Known robotic bottle filling mechanism may be adapted for use in various embodiments Similarly, labeler 222 may be used for labeling packages from the bottle filler 220 and/or cartridges 208 themselves. It follows that labeler 222 may be able to fix and/or print one or more labels on a given package and/or cartridge 208, e.g., using an adhesive, a transparent sleeve, placement of a self-adhering label, direct printing e.g., by inkjet printing, etc. As described above, labeling requirements may be imposed on certain health products stored in library 10, and may thereby control the content, look, placement, etc. of the labels applied by the labeler 222 on certain packages and/or cartridges 208. Moreover, labels can be printed onto a label and/or directly on the packaging on demand under control of the controller. Known robotic printing and/or labeling mechanism may be adapted for use in various embodiments.

The automated health product dispensary library 10 may additionally include a point-of-sale (POS) device 230 as illustrated in FIG. 2A. The POS device 230 provides a point at which a user (e.g., customer) is able to financially interact with the automated health product dispensary library 10. For example, the POS device 230 may allow for a user to make a payment in exchange for health products stored in the automated health product dispensary library 10. At the point of sale, the controller 225 may calculate an amount owed by the user (e.g., customer), inform the user of the amount owed (e.g., via display screen 226), and/or provide options for the user to make a payment for the amount owed. Moreover, according to some approaches, the printer 228 may issue a receipt for the transaction upon receiving a payment for the amount owed, or an authorized portion thereof.

Depending on the type of POS device 230 included in a given embodiment, various forms of payment may be made. According to different approaches, a POS device 230 may include weighing scales, scanners, electronic and/or manual cash registers, Global Electronic Funds Transfer Point of Sale (EFTPOS) terminals, touch screens, etc., or other hardware and software available for use with the POS device 230, as would be appreciated by one skilled in the art upon reading the present description. For example, tenure payments may be held in a secure storage location within the storage frame 202 of the automated health product dispensary library 10, electronic payments may be transferred to a financial agency (e.g., a bank) via network 204, etc.

Moreover, the POS device 230 may include variations of hardware and/or software according to different approaches. According to one example, which is in no way intended to limit the invention, in some approaches the POS device 230 may also serve as a point of return whereby users may return incorrect health product orders and/or be refunded for incorrect charges. According to other examples, the POS device 230 may include advanced features to enable different functionality, e.g., such as inventory management, customer relationship management (CRM), financial computations, etc., depending on the desired embodiment.

In some embodiments, the POS device 230 may communicate with the network 204. Moreover, the network 204 is described herein as being connected to a wide range of devices 205, which may include POS hardware, tablets, smart phones, etc., and are external to the automated health product dispensary library 10 as described above. Thus embodiments in which the POS device 230 is in communication with network 204, POS functionality of the automated health product dispensary library 10 may extend to mobile applications, e.g., wireless transfers of funds using mobile devices. Accordingly, data corresponding to the POS device 230 e.g., sales, inventory, users, etc., may be stored on a remote server.

Figure 2B:
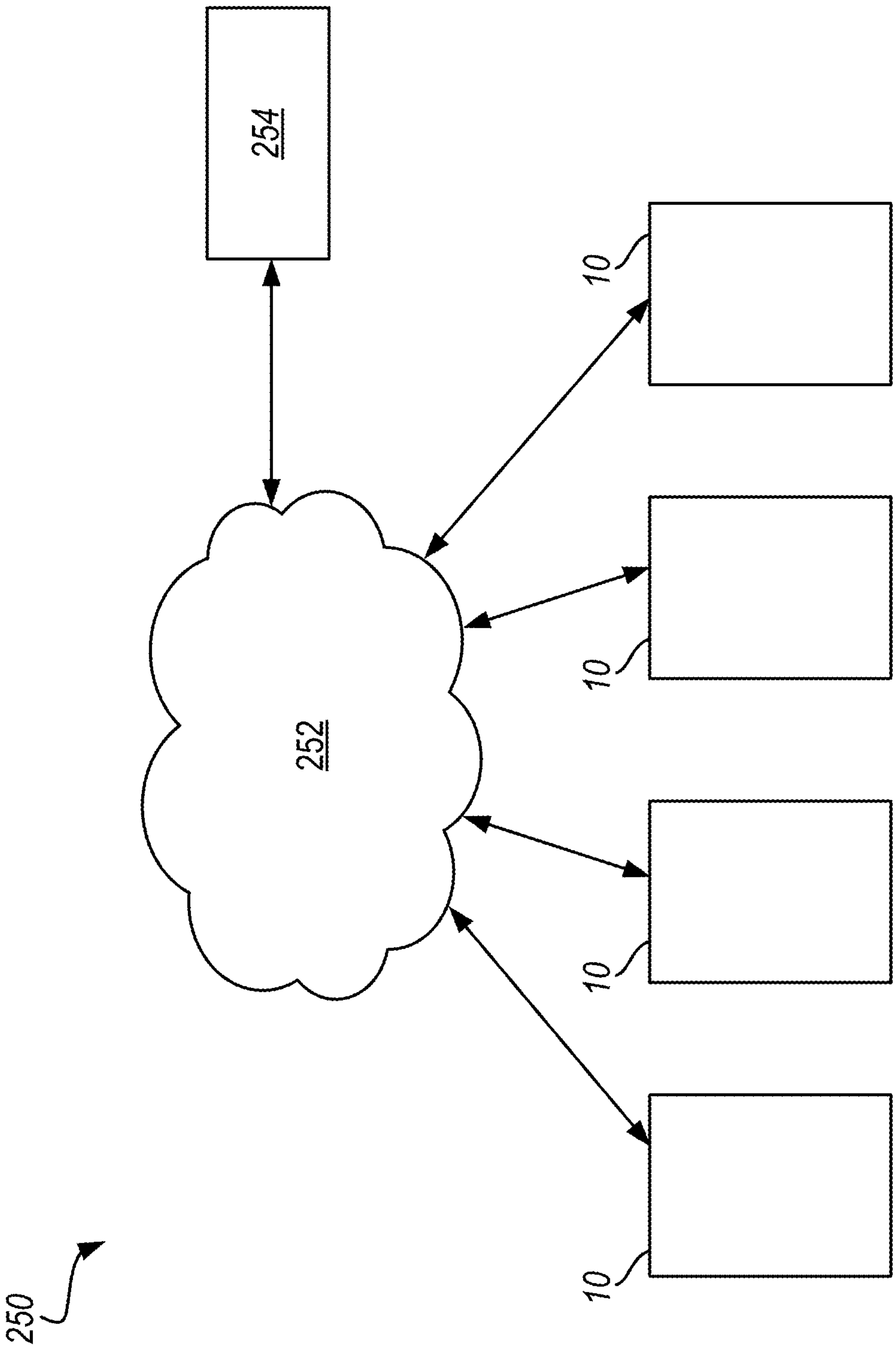
FIG. 2B is a representational diagram of an automated health product dispensary library system according to one embodiment.

FIG. 2B depicts a representational diagram of a system 250 for controlling a plurality of automated health product dispensary libraries, in accordance with one embodiment. As an option, the present system 250 may be implemented in conjunction with features from any other embodiment listed herein, such as those described with reference to the other FIGS. Specifically, FIG. 2B illustrates variations of the embodiment of FIG. 2A. Accordingly, various components of FIG. 2B have common numbering with those of FIG. 2A.

However, such system 250 and others presented herein may be used in various applications and/or in permutations which may or may not be specifically described in the illustrative embodiments listed herein. Further, the system 250 presented herein may be used in any desired environment. Thus FIG. 2B (and the other FIGS.) may be deemed to include any possible permutation.

Looking now to FIG. 2B, the system 250 includes a cloud network 252 which is connected to several different automated health product dispensary libraries 10. Depending on the desired embodiment, the cloud network 252 may function similar and/or the same as device 205 according to any of the approaches described above. Accordingly, cloud network 252 may account for supply levels and/or supply distribution for any of the several different automated health product dispensary libraries 10. Moreover, the cloud network 252 may include a unified memory which may be used to store data associated with any of the libraries 10 and may be updated as the data changes over time. The cloud network 252 may also be able to monitor for fraud, theft, misuse, etc. of the health products at any of the various automated health product dispensary libraries 10.

Cloud network 252 may be used to perform cloud computing for the system 250. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics May Include the Following:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning may appear to be unlimited and may be purchased in any quantity at any time.

Measured service: cloud systems may automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models May Include the Following:

Software as a Service (SaaS): the capability provided to the consumer is to use the provider's applications running on a cloud infrastructure. The applications may be accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but may have control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but may have control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment may be service oriented with a focus on statelessness, low coupling, modularity, and semantic interoperability.

Referring still to FIG. 2B, an administrator 254 (e.g., a controller) may be used to monitor and/or control the performance of the cloud network 252. Thus, the administrator 254 may oversee the distribution of health products on multiple levels at multiple locations. According to some embodiments, the administrator 254 may oversee and provide inventory for a plurality of automated health product dispensary libraries 10, e.g., as seen in FIG. 2B. Moreover, the administrator 254 may be able to reorder inventory across locations within the multiple libraries 10.

According to an in-use embodiment, which is in no way intended to limit the invention, a user may be able to send a health product request, e.g., a prescription, to an administrator via mail, email, fax, etc. Upon receiving the request, the administrator may coordinate the delivery of the requested health product(s) to a given dispensary library such that the health products are available for pickup by the user upon producing the prescription, a valid form of identification, etc. Similarly, automated health product dispensary libraries may include personal cartridges which may be tailored to meet a user's regular health product consumption and may be refilled periodically, e.g., daily, every 2 days, every 4 days, weekly, bi-weekly, monthly, etc., depending on the frequency of the user's regular health product intake and the amount health product(s) used.

Figure 3A:
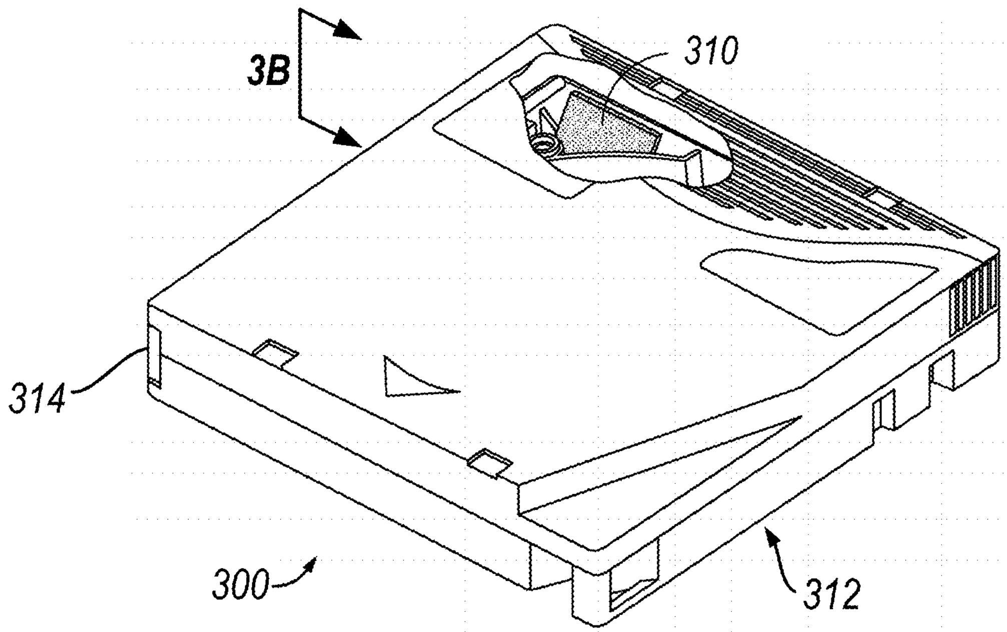
FIG. 3A is perspective view of a health product storage cartridge having a cutaway portion, according to one embodiment.
Figure 3B:
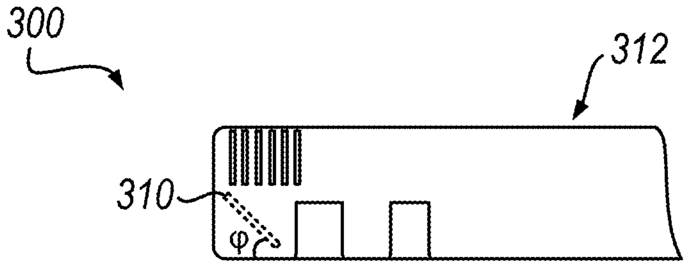
FIG. 3B is a side view of the health product storage cartridge of FIG. 3A.

Furthermore, FIGS. 3A-3B illustrate different views of a health product cartridge 300, in accordance with one embodiment. As an option, the health product cartridge 300 may be implemented in conjunction with features from any other embodiment listed herein, such as those described with reference to the other FIGS., such as FIGS. 2A-2B. However, such health product cartridge 300 and others presented herein may be used in various applications and/or in permutations which may or may not be specifically described in the illustrative embodiments listed herein. Further, the health product cartridge 300 presented herein may be used in any desired environment. Thus FIGS. 3A-3B (and the other FIGS.) may be deemed to include any possible permutation.

Referring now to FIG. 3A, health product cartridge 300 is illustrated as having a housing 312 which has a form factor similar to and/or the same as a tape cartridge. Referring to the present description, the form factor of the health product cartridge 300 may refer to the general exterior dimensions of the housing 312 being similar to that of a tape cartridge, e.g., such that an accessor configured to move a tape cartridge can also move the health product cartridge 300 by accessing the housing 312. Moreover, the form factor of the housing 312 may allow a corresponding health product cartridge 300 to fit in a slot specifically designed for receiving a tape cartridge.

Although the health product cartridge 300 may have a housing 312 which has a form factor similar to and/or the same as a tape cartridge, it should be noted that various health product cartridges described herein do not include a tape reel, magnetic tape, a brake button and/or an opening on a surface thereof for implementing a drive clutch, any of which may be found in conventional tape cartridges as would be appreciated by one skilled in the art upon reading the present description. In other approaches, one or more of these features may be present in the cartridge.

Referring still to FIG. 3A, the housing 312 is also preferably configured such that it defines an interior compartment of the health product cartridge 300. The health product cartridge 300 may be molded from a material, e.g., such as a polycarbonate plastic or any other conventional material.

The housing 312 may also have an access portion 314, e.g., a door, for providing access to the interior compartment of the health product cartridge 300. Thus, the interior compartment may be used to store one or more items, e.g., such as health products, in the health product cartridge 300 which may be accessible by using the access portion 314. According to some approaches, the access portion 314 may be manually opened, e.g., by a user in order to gain access to the interior compartment. However, in other approaches, the access portion 314 may be limited to a mechanism, a machine, instances where a key is provided, etc.

Moreover, although the access portion 314 is shown as being located on a specific corner of the health product cartridge 300 of FIG. 3A, according to other approaches, the access portion 314 may be located at any other location on the health product cartridge 300, e.g., on any other surface thereof. According to one approach, the access portion may include an LTO sliding door as would be appreciated by one skilled in the art upon reading the present description. However, according to other approaches, the access portion 314 may incorporate a hinged opening, a folding door, etc.

The interior compartment of some health product cartridges 300 may simply include a single communal space defined as the area between the surfaces of the cartridge. Health product cartridges 300 including a single communal space may be used in embodiments for which a single health product is stored therein, e.g., such that the separation of different health products is of no concern. However, in other approaches, health product cartridges 300 may implement dividers in the housing 312. The dividers may be used to form several isolated compartments within the interior compartment of the health product cartridges 300, each of which may be used to store health products therein. Moreover, each of the several isolated compartments within the interior compartment of the health product cartridges 300 may have a corresponding access portion 314. Thus, according to some approaches, a health product cartridge 300 may be able to store more than one health product such that each of the health products are stored in the several isolated compartments and are individually accessible via corresponding access portions.

According to some approaches, the interior compartment of the health product cartridge 300 may be completely sealed from an ambient environment when the access portion 314 is closed. In other words, access portion 314 may mate with the housing 312 when closed to make an airtight seal which prevents the transfer of air between the exterior and interior of the health product cartridge 300. Thus, in some approaches the access portion 314 may serve as the only opening to the interior compartment of the health product cartridge 300. Sealable interior compartments may be used to store health products which are sensitive to contaminants and/or certain storage conditions. For example, which is in no way intended to limit the invention, a health product cartridge 300 which is sealed from an ambient environment when the access portion 314 is closed may be used to store prescription drugs which are sensitive to microscopic organisms. Thus, the prescription drugs may be protected from being exposed to microscopic organisms which may be present in an automated health product dispensary library.

However, according to other approaches, the housing 312 and/or access portion 314 may not form a complete seal separating the interior compartment of the health product cartridge 300 from its exterior environment. In other words, the housing 312 and/or access portion 314 may allow for the transfer of air between the interior compartment of the health product cartridge 300 from its exterior environment. Thus, the health product cartridge 300 may be free to equalize pressure differentials between the interior and exterior of the housing 312, produced and/or assembled more efficiently, etc. Health product cartridges 300 may not require a completely sealed interior compartment when storing robust (e.g., insensitive) health products which are unaffected by ambient contaminants. For example, health product cartridges 300 storing medication which is sealed in individual dosage containers (e.g., packaging) and/or magazines of health product containers may not require a sealed interior compartment.

Furthermore, in some embodiments, health product cartridges 300 may include one or more antimicrobial agents in and/or on surfaces of the housing 312. The one or more antimicrobial agents may be applied to the desired surfaces of the housing 312 as an additional layer. However, in other approaches the one or more antimicrobial agents may be embedded in the housing material, e.g., during formation thereof. In one illustrative approach, the health product cartridges 300 may include one or more antimicrobial agents applied to the inner surfaces of the interior compartment of the health product cartridge 300 during and/or after formation of the cartridge. Thus, the antimicrobial agents may provide an improved storage environment for any health products stored in the cartridge.

The implementation of one or more antimicrobial agents to a health product cartridge may be desired when storing health products in the health product cartridge which are sensitive to being exposed to microscopic organisms. Embodiments implementing a sealed interior compartment may still encounter microscopic organisms, e.g., which may be introduced to the interior compartment when an access portion 314 is opened to insert and/or remove health products stored therein. According to various approaches, the antimicrobial agents in and/or on surfaces of the housing 312 may include Titanium Dioxide ($TiO_2$) nanoparticles, silver nanoparticles, etc., or any other antimicrobial agent which would be apparent to one skilled in the art upon reading the present description. Moreover, the diametral range of the antimicrobial agents may be from about 10 nm to about 100 nm, but could be higher or lower depending on the desired embodiment. In some approaches, the effect of the antimicrobial agents may be further augmented by using ultraviolet light (e.g., ultraviolet A light) in the housing 312 and/or health product cartridges 300. The ultraviolet light may output about 50 microwatts/$cm^2$, but could be higher or lower depending on the desired embodiment.

Referring still to FIG. 3A, health product cartridge 300 includes a cartridge memory 310 shown in a cutaway portion of the cartridge 300, which is in no way intended to limit the invention. In different approaches, various configurations of health product cartridge 300 may be used, regardless of whether the health product cartridge includes a cartridge memory or not. The cartridge memory 310 may be used to track the contents, status, environmental condition, etc. of the health product cartridge 300 as they change over time.

Moreover, looking to the side view of the health product cartridge 300 shown in FIG. 3B, the cartridge memory 310 is shown as being oriented at an angle $\varphi$. The angle $\varphi$ at which the cartridge memory 310 is oriented may be about 45 degrees relative to the adjacent bottom surface of the health product cartridge 300 housing 312, but may be higher or lower depending on the desired embodiment. Orienting the cartridge memory 310 at an angle $\varphi$ relative to the side of the health product cartridge 300 desirably enables an accessor (e.g., see 210 of FIG. 2A) the ability to read the cartridge memory 310 from differing angles without a null. Moreover, in some approaches an angled cartridge memory 310 may allow a storage cell equipped with a reader the ability to read the cartridge memory 310.

Figure 3C:
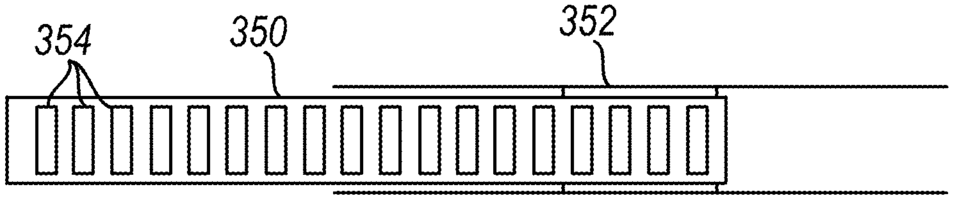
FIG. 3C is a side view of a health product storage cartridge reel according to one embodiment.

Alternative to storing loose health products in compartments within a health product cartridge, a health product cartridge may include an interior supply roll of health products, e.g., as illustrated in FIG. 3C. According to the present embodiment, a spool 352 is depicted as holding the supply roll 350 having health products 354 coupled thereto. The supply roll 350 may be a flexible membrane which is wound onto the spool 352. Depending on the approach, health products 354 may be coupled to the supply roll 350 by being placed in protective bubbles, e.g., capsules, along the length of the supply roll 350. Moreover, sections of the supply roll 350 may be unrolled from the spool 352 and separated by perforations such that the sections of the supply roll 350 may be selectively detached from the remainder of the supply roll 350.

Figure 4:
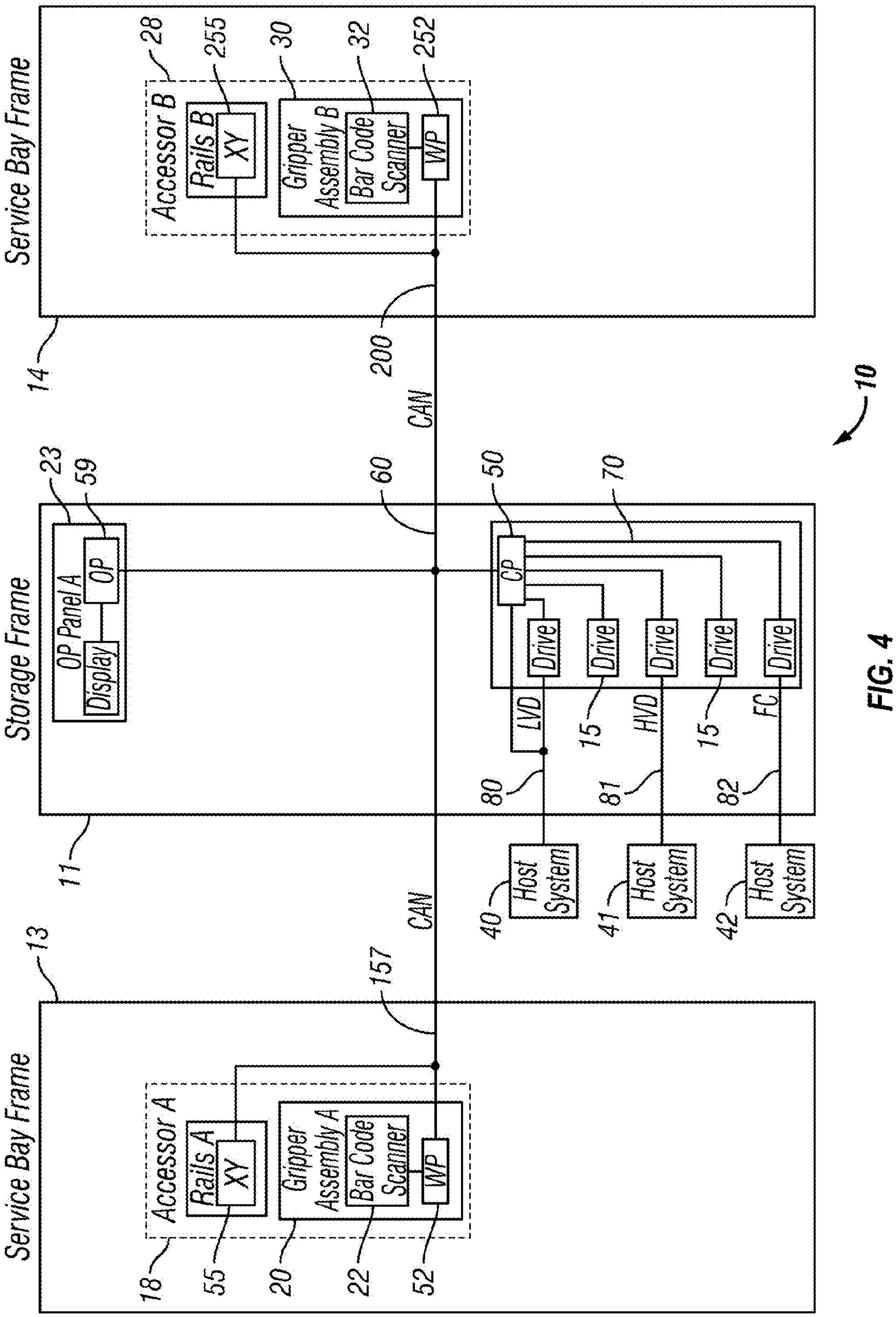
FIG. 4 is a block diagram of an automated health product dispensary library according to one embodiment.

FIG. 4 depicts another implementation of an automated health product storage library 10, in accordance with an exemplary embodiment. As an option, the present automated health product storage library 10 may be implemented in conjunction with features from any other embodiment listed herein, such as those described with reference to the other FIGS. Of course, however, such automated health product storage library 10 and others presented herein may be used in various applications and/or in permutations which may or may not be specifically described in the illustrative embodiments listed herein. Further, the automated health product storage library 10 presented herein may be used in any desired environment. Thus FIG. 4 (and the other FIGS.) should be deemed to include any and all possible permutations Referring now to FIG. 4, the automated health product storage library 10 as described in reference to FIGS. 1A-1B, is depicted in accordance with an exemplary embodiment which is in no way intended to limit the invention. According to a preferred approach, the library 10 may employ a controller, e.g., arranged as a distributed system of modules with a plurality of processor nodes in a configuration known in the art.

Referring still to FIG. 4, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the health product stored in a given cartridge depending on the desired embodiment. Furthermore, the right hand service bay 14 is shown having a second accessor 28, which includes a gripper assembly 30 and may also include a reading system 32 to "read" identifying information about the health product stored in a given cartridge.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc., the health product storage cartridge at the storage slots (e.g., see 16 of FIG. 1B), multi-cartridge deep slot cells (e.g., see 100 of FIG. 1B), storage drives 15, etc.

With continued reference to FIG. 4, library 10 receives commands from one or more host systems 40, 41, 42. The host systems 40, 41, 42, such as host servers, communicate with the library directly, e.g., on path 80, through one or more control ports (not shown), or through one or more storage drives 15 on paths 81, 82. Thus, in different approaches, the host systems 40, 41, 42 may provide commands to access particular health product storage cartridges and move the cartridges, for example, between the storage slots 16 and the storage drives 15. The commands are typically logical commands identifying the cartridges or cartridge health products, and/or logical locations for accessing the health products. Furthermore, it should be noted that the terms "commands" and "work requests" are used interchangeably herein to refer to such communications from the host system 40, 41, 42 to the library 10 as are intended to result in accessing particular health products stored within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 4, the communication processor node 50 may additionally provide a communication link 70 for communicating with the storage drives 15. As illustrated, the communication processor node 50 may preferably be located in the storage frame 11, e.g., close to the storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

With continued reference to FIG. 4, the communication processor node 50 is coupled to each of the storage drives 15 of a storage frame 11, via lines 70. Thus, nodes 50 may thereby be communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As would be appreciated by one of skill in the art upon reading the present description, various communication arrangements may be employed for communication with the hosts and with the storage drives. In the example of FIG. 4, host connections 80 and 81 are intended to be SCSI busses. However, path 82 may include a bus such as a Fibre Channel bus which is a high speed serial data interface, allowing transmission over greater distances than the SCSI bus systems.

According to some approaches, the storage drives 15 may be in close proximity to the communication processor node 50, and may employ a short distance communication scheme, such as SCSI, or a serial connection, such as RS-422. Thus the storage drives 15 may be individually coupled to the communication processor node 50 by means of lines 70. Alternatively, the storage drives 15 may be coupled to the communication processor node 50 through one or more networks, such as a common bus network.

Furthermore, additional storage frames 11 may be provided, whereby each is preferably coupled to the adjacent storage frame. According to various approaches, any of the additional storage frames 11 may include communication processor nodes 50, storage slots 16, storage drives 15, networks 60, etc.

Moreover, as described above, the automated data storage library 10 may include a plurality of accessors. As previously mentioned, a second accessor 28, for example, is shown in a right hand service bay 14 of FIG. 4. The second accessor 28 may include a gripper assembly 30 for accessing the health product cartridges, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 4 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically includes one or more controllers to direct the operation of the automated health product dispensary library. Moreover, host computers and/or storage drives may include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

According to some approaches, a library controller may maintain an inventory of health product cartridges stored in an associated health product dispensary library. Moreover, the inventory of health product cartridges may be updated fully, partially, etc. upon completion of a task, after an amount of time has passed, on demand, etc., depending on the desired approach.

Figure 5:
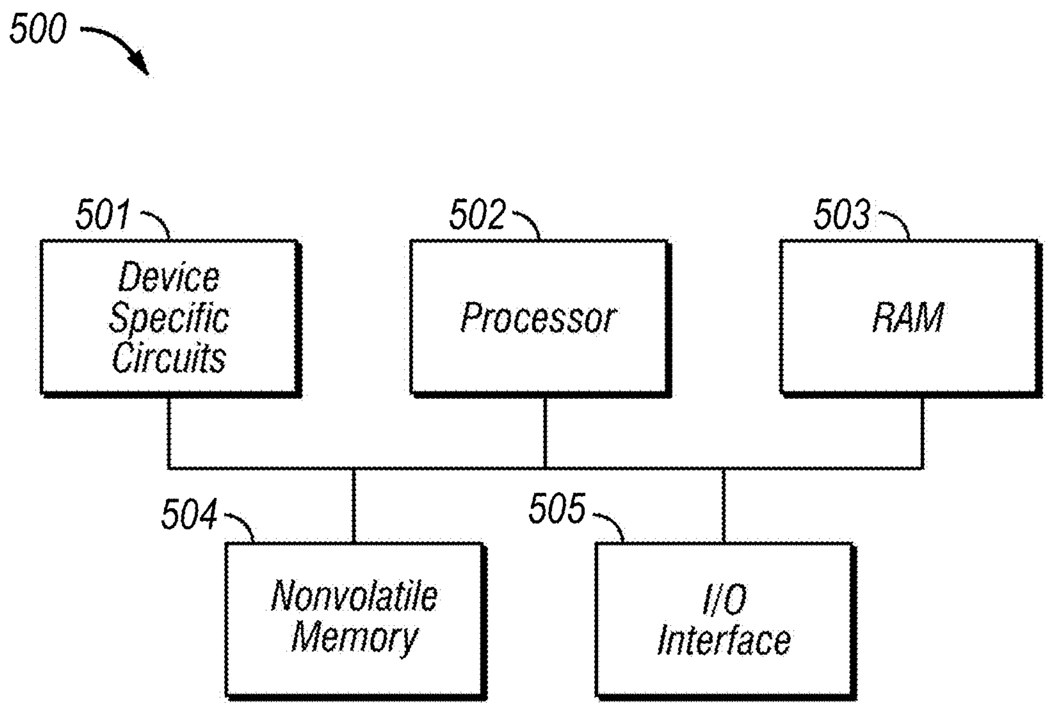
FIG. 5 is a block diagram depicting a controller configuration according to one embodiment.

Referring now to FIG. 5, a typical controller 500 is shown with a processor 502, Random Access Memory (RAM) 503, nonvolatile memory 504, device specific circuits 501, and I/O interface 505. Alternatively, the RAM 503 and/or nonvolatile memory 504 may be contained in the processor 502 as could the device specific circuits 501 and I/O interface 505. The processor 502 may comprise, for example, an off-the-shelf microprocessor, custom processor, Field Programmable Gate Array (FPGA), Application Specific Integrated Circuit (ASIC), discrete logic, etc. The RAM 503 is typically used to hold variable data, stack data, executable instructions, etc.

According to various approaches, the nonvolatile memory 504 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 504 is typically used to hold the executable firmware and any nonvolatile data. Moreover, the I/O interface 505 comprises a communication interface that allows the processor 502 to communicate with devices external to the controller. Examples may comprise, but are not limited to, serial interfaces such as RS-232, USB (Universal Serial Bus) or Small Computer Systems Interface (SCSI). The device specific circuits 501 provide additional hardware to enable the controller 500 to perform unique functions including, but not limited to, motor control of a cartridge gripper. Moreover, the device specific circuits 501 may include electronics that provide, by way of example but not limitation, Pulse Width Modulation (PWM) control, Analog to Digital Conversion (ADC), Digital to Analog Conversion (DAC), etc. In addition, all or part of the device specific circuits 501 may reside outside the controller 500.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 4) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 6A:
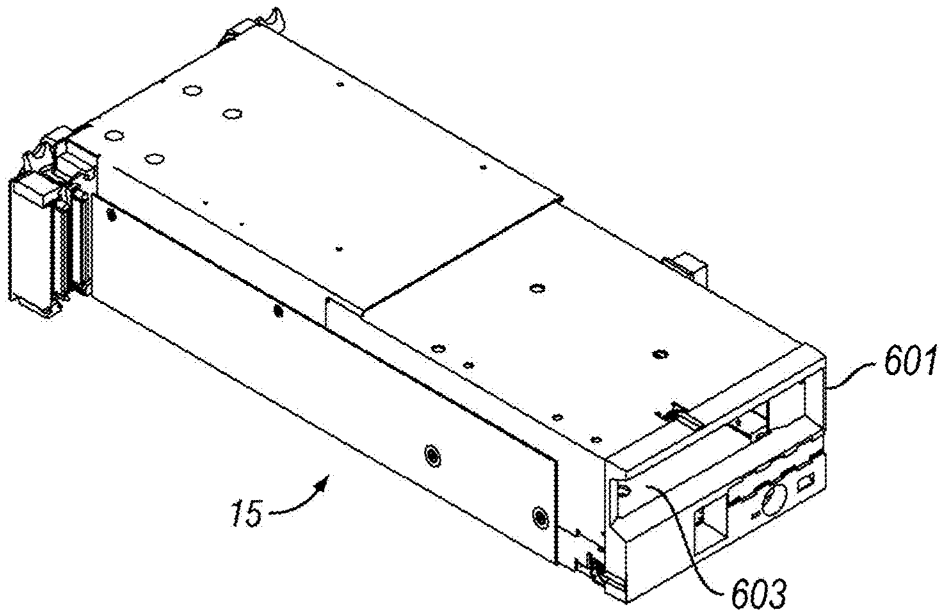
FIG. 6A is a frontal perspective view of a storage drive according to one embodiment.
Figure 6B:
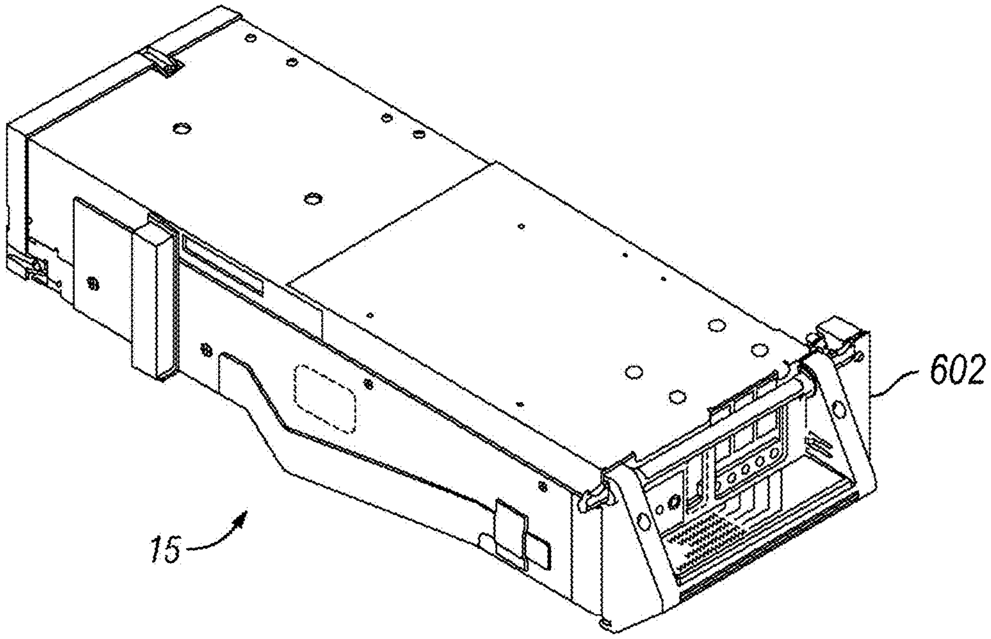
FIG. 6B is a rear perspective view of the storage drive of FIG. 6A.

Because in some embodiments the health product cartridges have a form factor similar to a tape cartridge, tape-based data storage may be integrated therewith, e.g., to store information about the health items stored in the library such as quantities of health products in the library, origins of the health products, locations of health products in the library, patient records, prescriptions, etc. The library controller may interact with one or more conventional tape cartridges and one or more tape-based data storage drives to effect such data storage. Accordingly, FIGS. 6A-6B illustrate the front 601 and rear 602 views of a data storage drive 15, according to one embodiment. In the example depicted in FIGS. 6A-6B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 603.

Figure 7A:
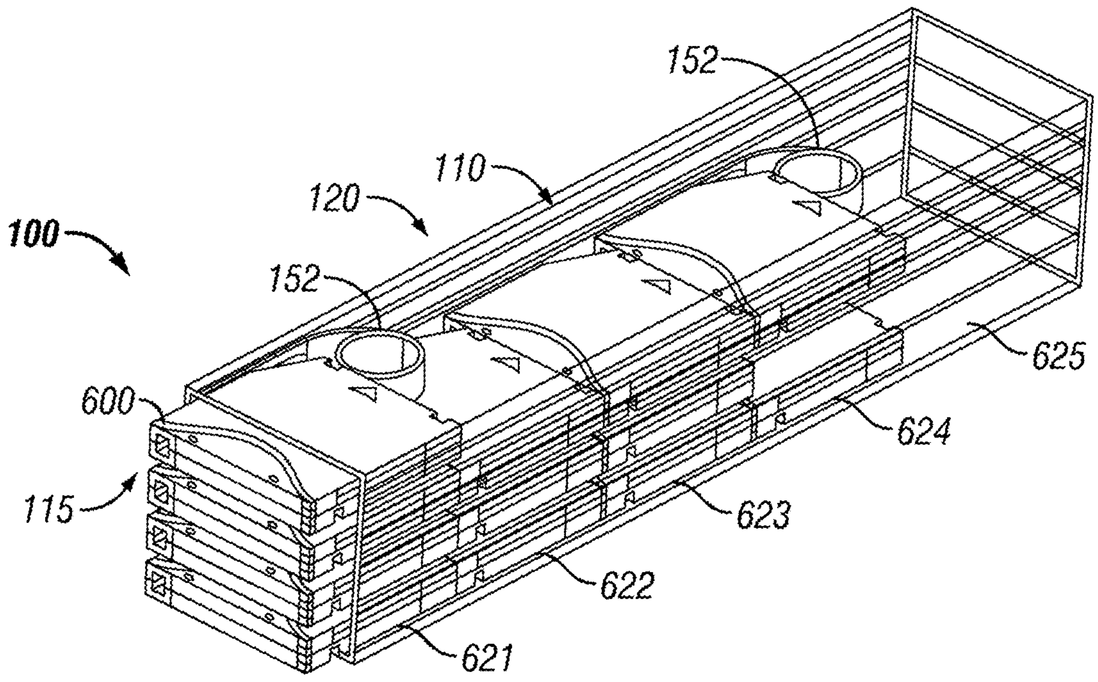
FIGS. 7A-7B are perspective views of a multi-cartridge deep slot cell according to one embodiment.
Figure 7B:
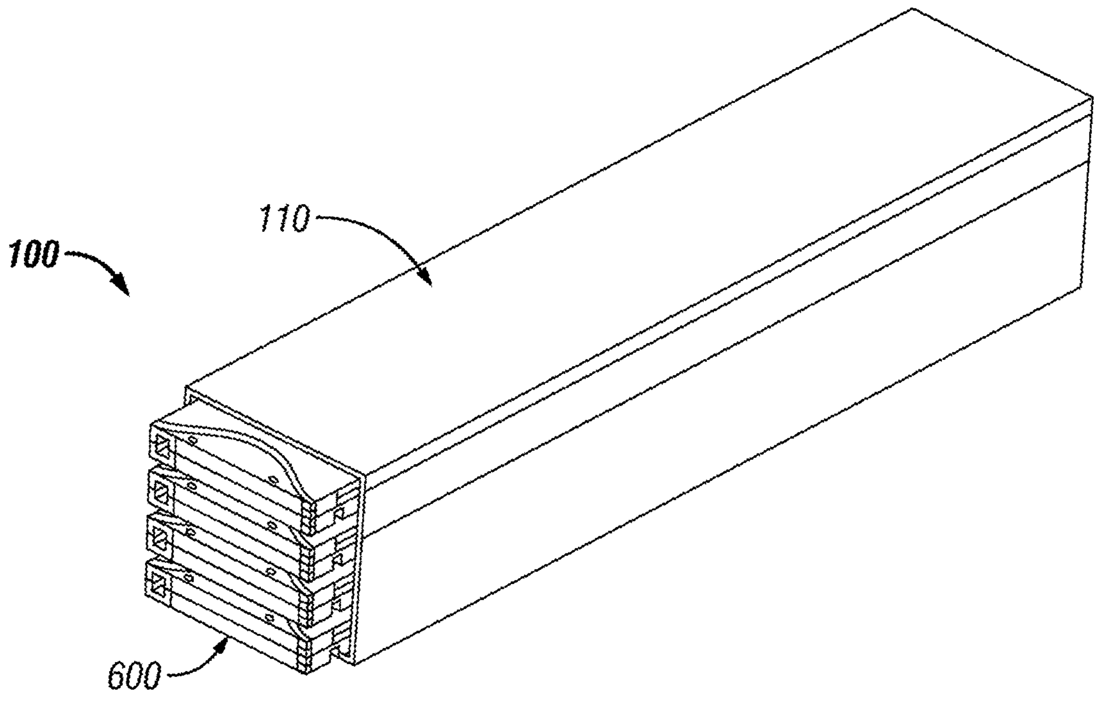

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 are disposed within the housing, and may be configured for storing up to a plurality of data storage cartridges 600, depending on the desired approach. Alternatively, the multi-cartridge deep slot cell 100 may be built into the frame of the automated data storage library according to one approach.

The deep slot cell 100 may be used to store multiple health product cartridges. According to some approaches, the deep slot cell 100 may be configured to store magazines of health product cartridges. Individual contents of a given deep slot cell 100 may be accessed and/or removed to be sent to a user, to a different storage library, to a distributor, to a supplier (e.g., for refilling), etc. However, in other approaches, all contents of a deep slot cell 100 may be removed and sent to a user, to a different storage library, to a distributor, to a supplier (e.g., for updating, refilling, etc.), etc. as a single rack of health product cartridges. Thus, some embodiments may include racks which are capable of holding (e.g., securely storing) multiple health product cartridges together. According to alternate approaches, magazines configured to hold more than one health product cartridge may be included.

Although racks, magazines, deep slot cells, etc. may be used to store health product cartridges that contain at least some health products stored therein, in other embodiments the racks, magazines, deep slot cells, etc. may be used to receive old and/or empty cartridges. Upon being filled, racks, magazines, deep slot cells, etc. may be sent to a manufacturer, e.g., as a way to dispose of the unused health products and to trigger the delivery processes of sending replacements.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
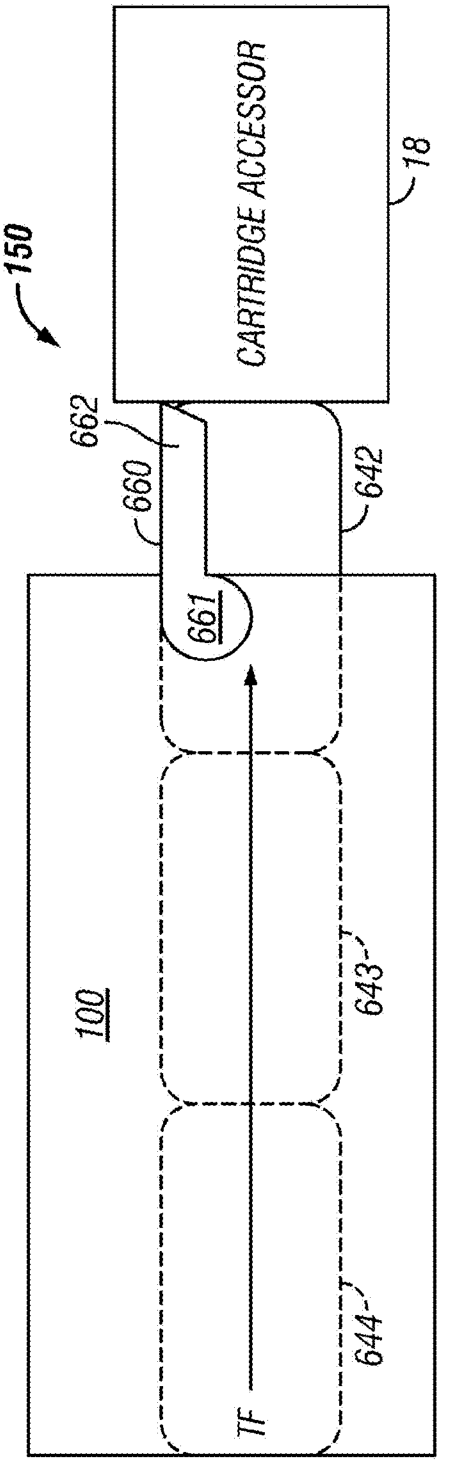
FIGS. 8A-8D are partial side views of a cartridge blocking mechanism according to one embodiment.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

Figure 8B:
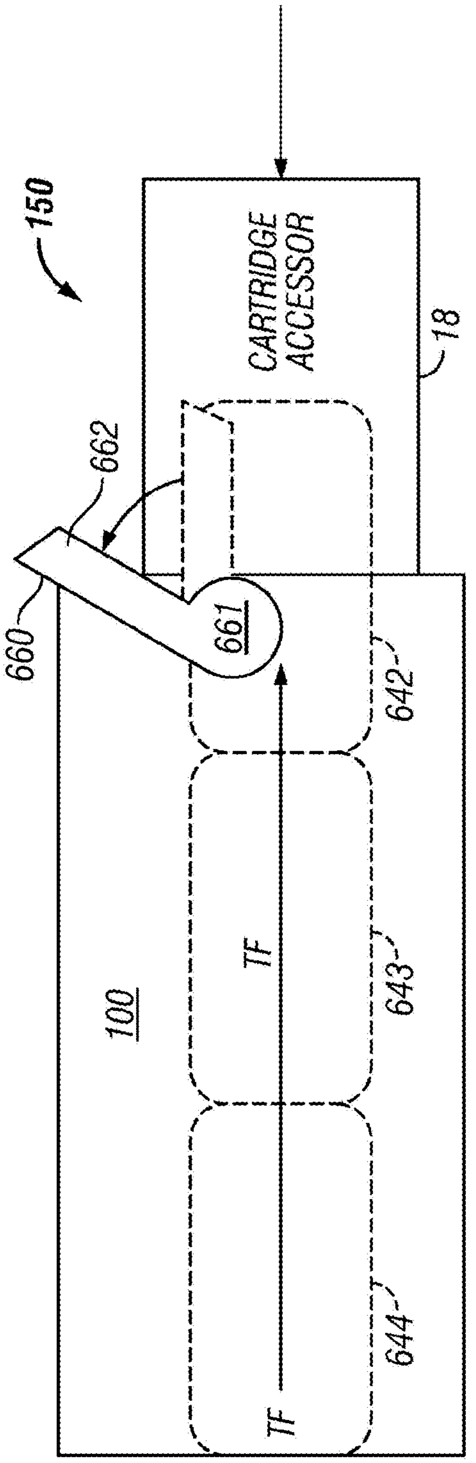
Figure 8C:
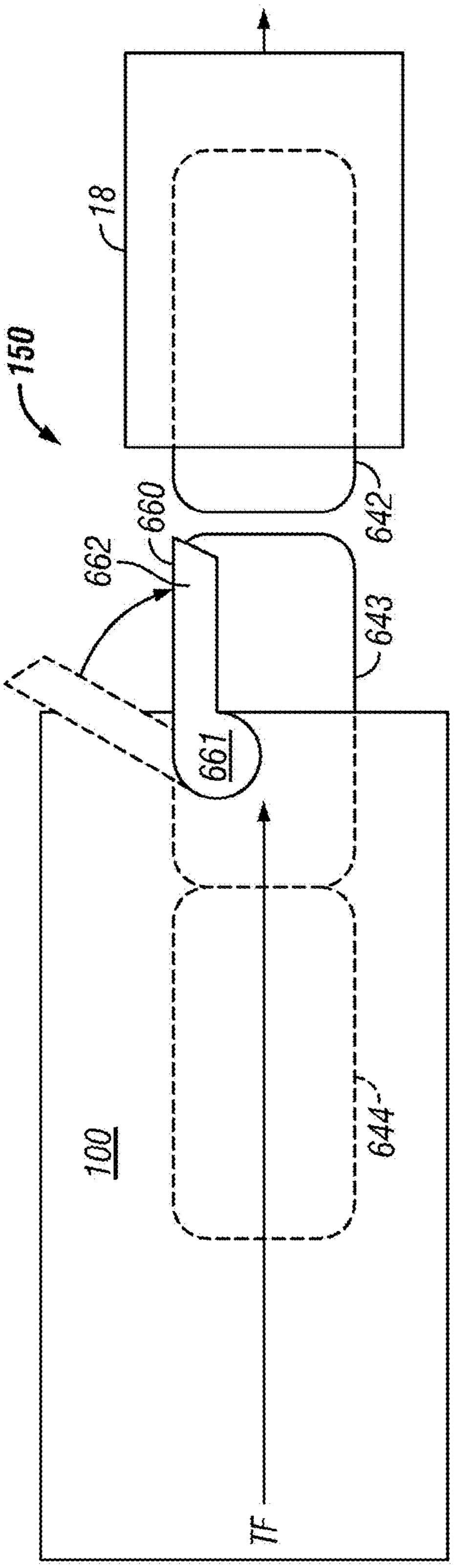

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8D:
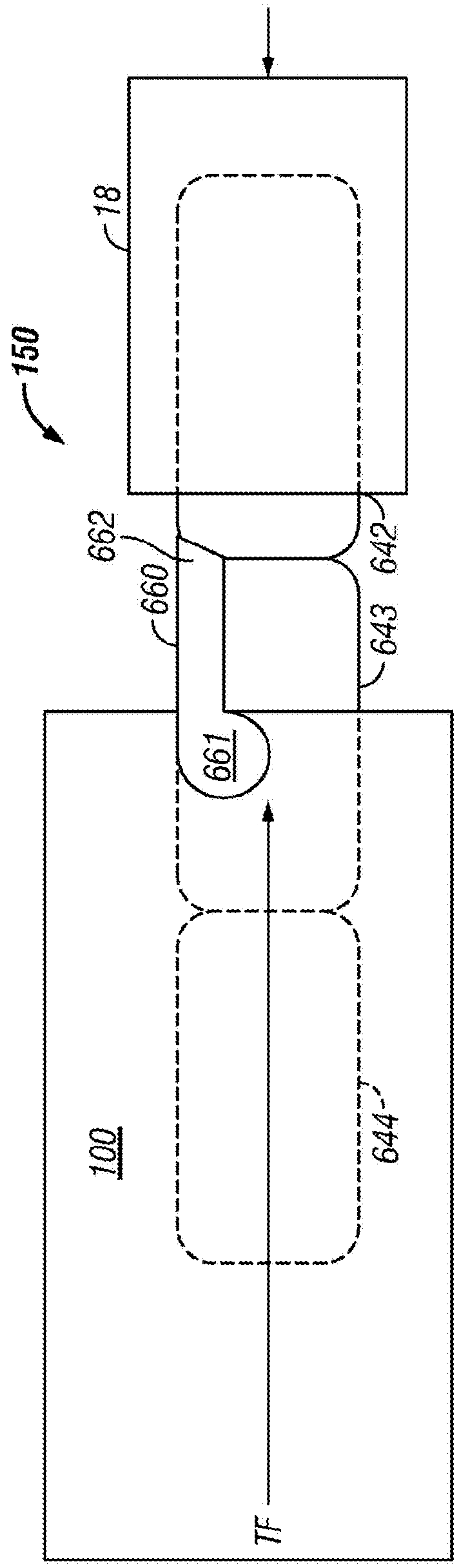

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to the embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 1B, in one embodiment, the single cartridge storage slots 16 are also termed "tier 0".

Referring again to FIGS. 1A-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

Figure 9:
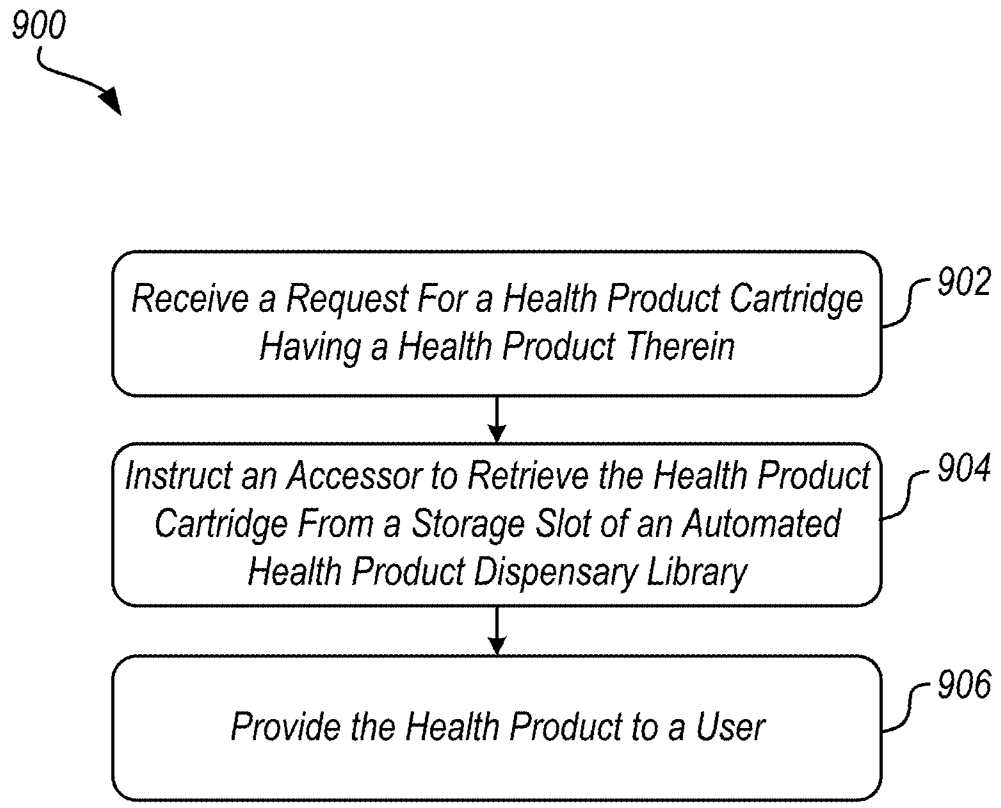
FIG. 9 is a flowchart for a method according to one embodiment.

According to an exemplary embodiment, which is in no way intended to limit the invention, FIG. 9 illustrates a flowchart of a method 900. The method 900 may be performed in accordance with the present invention in any of the environments depicted in FIGS. 1-8D, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 includes receiving a request for a health product cartridge having a health product stored therein. See operation 902. Moreover, operation 904 includes instructing an accessor to retrieve the health product cartridge from a storage slot of an automated health product dispensary library. Furthermore, upon retrieving the health product cartridge, operation 906 includes providing the health product to a user, e.g., who made the initial request.

According to some approaches, method 900 may include performing an optional authorization process upon receiving the request for ensuring a propriety of the request prior to providing the health product to the user. As described herein, various health products may include one or more security features of known type and may thereby require an authorization process to ensure the security features are met.

At any time, a full, partial, on demand, etc., inventory of the health product cartridges in a storage library may be performed. According to one approach, an inventory may be performed each time a health product is provided to a user, e.g., to ensure an adequate supply of health products. The result of the inventory may be reported to a remote server, directly to an administrator, etc., depending on the desired embodiment. Moreover, depending on the result of the inventory check, requests for additional health products may be sent to a manufacturer, a distributor, an administrator, etc., preferably without human interaction (e.g., automated).

According to another embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 10:
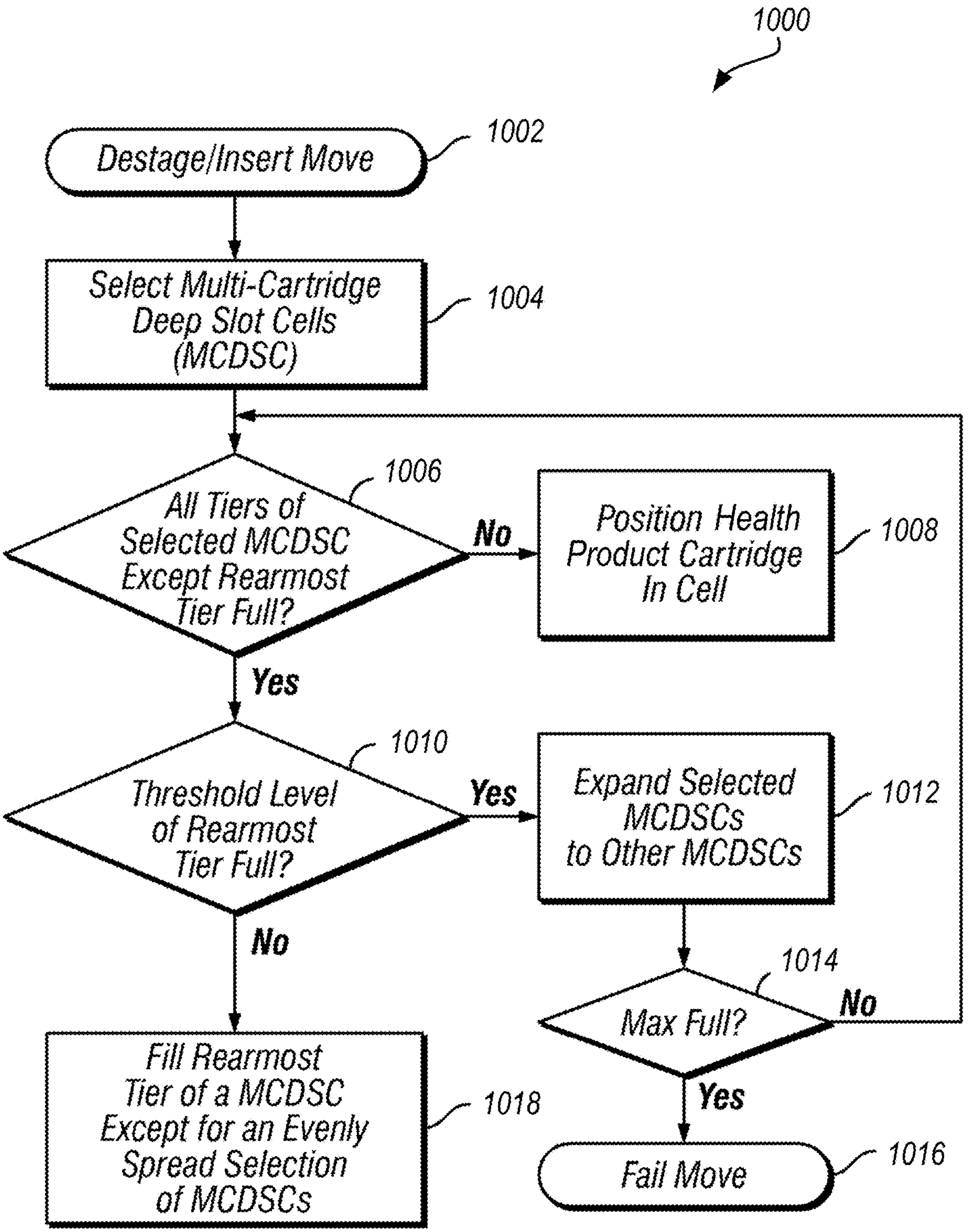
FIG. 10 is a flowchart for a method according to one embodiment.

Now referring to FIG. 10, a flowchart of a method 1000 is shown according to one embodiment. The method 1000 may be performed in accordance with the present invention in any of the environments depicted in FIGS. 1-8D, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art. Moreover, explanation of method 1000 is done with continued reference to the storage frame 11 of FIG. 1B.

Referring now to FIG. 10, method 1000 illustrates an embodiment of a method of storing data storage cartridges by an automated data storage library. The method 1000 may be used to selectively extract, place and transport data storage cartridges with respect to multi-cartridge deep slot cells, where cartridges are placed in tier 1 (the frontmost tier) of a multi-cartridge deep slot cell, moving or demoting any other cartridges in the multi-cartridge deep slot cell by one tier.

The method 1000 includes performing destage and/or insert moves. See step 1002. According to a preferred approach, insert moves comprise adding new cartridges to the library. Moreover, according to other approaches, destage moves may result from demount moves, e.g., demounting cartridges from data storage drive(s) 15. In method 1000, the library controller operates the accessor(s) to selectively extract a specific cartridge from one location, and transport the data storage cartridge with respect to other elements of the automated data storage library.

When the operation(s) at the data storage drive are complete, the controller operates the accessor(s) to return the cartridge to a storage slot 16 or to a multi-cartridge deep slot cell 100. However, if all of the single cartridge storage slots 16 are full, at least in the particular frame of the library of the data storage drive 15 from which the data storage cartridge was previously demounted, the controller may swap the data storage cartridge with a data storage cartridge in another storage slot. Furthermore, the swapped data storage cartridge may then be demoted to tier 1 of a multi-cartridge deep slot cell 100, in an action called "destage", and the demounted cartridge is moved to the storage slot vacated by the demoted cartridge.

As an example, which is in no way intended to limit the invention, all of the single cartridge storage slots may be full because the cartridges mounted in the data storage drives are all from the multi-cartridge deep slot cells. Moreover, according to another approach, the movement of the data storage cartridges may be conducted while maintaining the rearmost tier of the multi-cartridge deep slot cells vacant, called "depth spreading".

Referring again to FIG. 10, step 1004 comprises selecting the multi-cartridge deep slot cells (MCDSC) from which to make the choice of loading for a destage or insert move, depending on step 1002. One choice may include a single column of multi-cartridge deep slot cells closest to the source of the move, which may limit the potential lateral movement of the accessor. However, an expanded choice may be a section of the library encompassing more than one column. Another choice may be a frame of the library, while a last choice may be the entire library.

In a preferred approach, the library controller maintains an inventory of cartridges and cells, and completes the selection of a multi-cartridge deep slot cell to place the added or inserted cartridge before movement of the accessor.

Moreover, the inventory may be updated fully, partially, etc. upon completion of a task, after an amount of time has passed, on demand, etc., depending on the desired approach.

According to different approaches, at least one, some, a majority, all, etc. of the multi-cartridge deep slot cells in the chosen set may be "selected", while the remainder may be reserved. One example comprises reserving a multi-cartridge deep slot cell to temporarily deposit or store data storage cartridges extracted from the front tiers of another multi-cartridge deep slot cell in order to access and extract a cartridge towards or at the rear of that other multi-cartridge deep slot cell.

With continued reference to FIG. 10, in step 1006, the library controller determines whether one or more tiers in addition to the rearmost tier (e.g., 625 of FIG. 7A) is available in any of the selected multi-cartridge deep slot cells, or whether all tiers except the rearmost tier are full.

If at least one tier other than the rearmost tier is available, "NO", in step 1008, the library controller operates the accessor(s) to place the next cartridge in one of the selected multi-cartridge deep slot cells, until the stage is reached where each of the frontmost tiers of the selected multi-cartridge deep slot cells become full. According to one approach, the library controller may operate the accessor(s) to place health product cartridges in the multi-cartridge deep slot cells while maintaining the rearmost tier of the cells vacant. Thus, each of the multi-cartridge deep slot cells may be full except for the rearmost tier of each of the cells.

Referring back to step 1006 of FIG. 10, if all of the tiers except the rearmost tier are full, "YES", step 1010 determines whether a threshold level of the selected multi-cartridge deep slot cells are full, including the rearmost tier. According to one approach, the threshold may be considered as a determination whether a minimum level of the number of available positions in the rearmost tier of the selected cells has been reached. Moreover, some positions are left available to temporarily deposit or store data storage cartridges extracted from the front tiers of another multi-cartridge deep slot cell in order to access and extract a cartridge towards or at the rear of that other multi-cartridge deep slot cell.

The threshold level may, for example, be that ⅞ of the rearmost tiers of the selected set of multi-cartridge deep slot cells are full and that ⅛ are vacant. In another approach, the threshold may be a specific number of vacancies. The threshold level, in one embodiment, may be predetermined as based on the likely number of cartridges that will be temporarily deposited while accessing a cartridge located in a rearmost tier.

Looking again to step 1010, if the threshold level of the selected set of multi-cartridge deep slot cells has been reached, "YES", in step 1012, the selection of multi-cartridge deep slot cells is expanded. For example, if the initial selection is a specific column of cells, the selection may be expanded to a number of adjacent columns of cells, to the cells in an entire frame, to the cells of the entire library, etc. Furthermore, if step 1014 indicates that the threshold level has been reached for the maximum selection of cells, the destage or insert move is failed in step 1016. Otherwise, the process returns to step 1006 where the expanded set of multi-cartridge deep slot cells are checked again.

According to one approach, if the library controller has determined that all tiers of the selected multi-cartridge deep slot cells except the rearmost tier are full, e.g., in step 1006, another data storage cartridge may be added to the library 10. Moreover, the added data storage cartridge may be demoted to tier 1 in the operations of selectively extracting, placing and transporting data storage cartridges, but is not limited thereto.

With continued reference to the method 1000 of FIG. 10, when all tiers except the rearmost tiers are full, and the threshold level of step 1010 has not been reached, "NO", in step 1018, destaged or inserted data storage cartridges are placed in selected multi-cartridge deep slot cells in tier 1 so as to demote the other cartridges in the cell. As a result, the rearmost tier of the multi-cartridge deep slot cells are filled, except for an evenly spread selection of the multi-cartridge deep slot cells. In one approach, the evenly spread selection may include filling the rearmost tier of multi-cartridge deep slot cells having vacant rearmost tiers based on a random selection. Moreover, as the rearmost tier of one of the multi-cartridge deep slot cells is filled, that cell is removed from the random selection.

However, according to another approach, in response to the determination that all tiers of the selected multi-cartridge deep slot cells 100 except the rearmost tier are full, the library controller may operate the accessor(s) to place data storage cartridges to fill the selected multi-cartridge deep slot cells except for the rearmost tier of every Nth selected multi-cartridge deep slot cell. As one example, "N" may comprise a binary number beginning with "2", or every second cell. The selection of every second cell may begin at any arbitrary cell of the library, and may comprise selecting cells to fill or cells to maintain the rearmost tier vacant.

According to another embodiment, the library controller may employ tie breakers as needed to place the added data storage cartridges in the frontmost tier of the multi-cartridge deep slot cell 100 having the every second, fourth, etc. cell that has the rearmost tier available. According to different approaches, the tie breaker may select the specific cell based on its having the least recently used data storage cartridge in the frontmost tier and/or is at the closest proximity to the source of the move, but is not limited thereto.

Thus, according to one approach, the method 1000 of FIG. 10 may continue in binary fashion, filling and leaving vacant the rearmost tier every eighth multi-cartridge deep slot cell 100, etc., and may ultimately fill the rearmost tier of all multi-cartridge deep slot cells, or reach the defined threshold of multi-cartridge deep slot cells set by the library controller.

The "depth spreading" discussed above provides an evenly spread availability of at least the rearmost tier of a number of multi-cartridge deep slot cells, for example, through random selection, or by leaving the rearmost tier of every Nth one of the multi-cartridge deep slot cells vacant. This vacant tier of a number of multi-cartridge deep slot cells, in one embodiment, provides vacant tiers in which to temporarily store or deposit the overlying data storage cartridges to gain access to the target data storage cartridge. Also, or alternatively, certain of the multi-cartridge deep slot cells or certain tiers may be reserved for the purpose of temporarily depositing data storage cartridges overlying a target cartridge.

It follows that the various embodiments described herein be and/or be used in automated health product dispensary libraries which utilize the form factor of tape cartridges to store health products in dense storage configurations. Moreover, the automated nature of the health product libraries allow for automation of dispensing and maintaining the inventory of health products.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as a processor and/or controller 500 of FIG. 5. The memory elements can include local memory employed during actual execution of the program code, such as nonvolatile memory 504 of FIG. 5, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above. For example, those of skill in the art will understand that changes may be made with respect to the methods discussed above, including changes to the ordering of the choices of the methods of FIGS. 9-10. Further, those of skill in the art will understand that differing specific component arrangements may be employed than those illustrated herein.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An automated health product dispensary library, comprising:

storage slots configured to receive health product cartridges that have health products therein; and an accessor, configured to transport tape cartridges, for transporting the health product cartridges, wherein a first subset of the storage slots is separated from a second subset of the storage slots by a physical partition, wherein the physical partition is configured to maintain an ambient temperature for the first subset of the storage slots that is different than an ambient temperature for the second subset of the storage slots.

2. The automated health product dispensary library as recited in claim 1, comprising a controller configured to enforce at least two logical partitions of a plurality of the health product cartridges, wherein the logical partitions correspond to physical attributes of the health products.

3. The automated health product dispensary library as recited in claim 1, wherein the physical partition is configured to implement a storage standard for one of the first and second subsets of the storage slots that is different than a storage standard for the other one of the first and second subsets of the storage slots, wherein the storage standards are a security feature.

4. The automated health product dispensary library as recited in claim 1, comprising at least one of a display screen and a printer for outputting at least one of warnings and instructions about the health products.

5. The automated health product dispensary library as recited in claim 1, comprising at least one of the following apparatuses for receiving the cartridges from the accessor: a bottle filler for packaging the health products into packages, and a labeler for labeling at least one of packages and the cartridges.

6. The automated health product dispensary library as recited in claim 1, comprising logic configured to cause the accessor to agitate a given cartridge in response to determining a characteristic of a health product stored in the given cartridge selected from a group of characteristics consisting of: the health product is in liquid form and the health product has been stationary for a predetermined amount of time.

7. The automated health product dispensary library as recited in claim 1, further comprising at least one of the health product cartridges having a health product therein.

8. The automated health product dispensary library as recited in claim 1, with a proviso that no tape drive is present in the library.

9. The automated health product dispensary library as recited in claim 1, wherein the physical partition has a door, wherein the accessor is configured to travel through the physical partition while the door is open.

10. A health product cartridge, comprising:

a housing having a form factor of a conventional data storage tape cartridge the housing defining an interior for storing a health product, the housing having an access portion for providing access to the interior; and a supply roll in the interior, the supply roll having the health product coupled thereto.

11. The health product cartridge as recited in claim 10, comprising an antimicrobial agent in and/or on the housing.

12. The health product cartridge as recited in claim 10, wherein the interior is sealed from an ambient environment when the access portion is closed.

13. The health product cartridge as recited in claim 10, comprising dividers in the housing, wherein the dividers form more than one isolated compartment in the interior of the housing, wherein each of the more than one isolated compartment has an access portion for providing access to the interior of the respective isolated compartment.

14. The health product cartridge as recited in claim 10, wherein the housing has the form factor of a Linear Tape Open-compatible tape cartridge.

15. A method, comprising:

receiving a request for a health product cartridge having a health product therein;

instructing an accessor to retrieve the health product cartridge from a storage slot of an automated health product dispensary library;

providing the health product to a user;

performing an inventory of the health product cartridges; and sending a request for additional health products based on the inventory wherein a first subset of the storage slots is separated from a second subset of the storage slots by a first physical partition, wherein the first physical partition is configured to implement a storage standard for one of the first and second subsets of the storage slots that is different than a storage standard for the other one of the first and second subsets of the storage slots, the storage standards being selected from a group consisting of: environmental control and a security feature, and comprising instructing the accessor to travel from the first subset of the storage slots to the second subset of the storage slots, wherein instructing the accessor to travel from the first subset of the storage slots to the second subset of the storage slots includes:

sending a request for permission for the accessor to enter the second subset of the storage slots, and allowing the accessor to move from the first subset of the storage slots to the second subset of the storage slots in response to receiving permission.

16. The method as recited in claim 15, comprising performing an authorization process upon receiving the request for ensuring a propriety of the request prior to providing the health product to the user.

17. The method as recited in claim 15, wherein the health product cartridge has a housing with a form factor of a Linear Tape Open-compatible tape cartridge.

18. The method as recited in claim 15, wherein the automated health product dispensary library includes at least one of a display screen and a printer for outputting at least one of warnings and instructions about the health products, wherein performing the inventory includes determining a usage rate of each of the health products stored in the health product cartridges.

19. The method as recited in claim 15, wherein an antimicrobial agent is present in and/or on a housing of the health product cartridge.

* * * * *